(12) United States Patent
Zhou et al.

(10) Patent No.: US 12,398,837 B2
(45) Date of Patent: Aug. 26, 2025

(54) ROBOTS FOR WATER TUNNEL INSPECTION AND SYSTEMS THEREOF

(71) Applicant: Hong Kong Centre for Logistics Robotics Limited, Hong Kong (CN)

(72) Inventors: Jianshu Zhou, Hong Kong (CN); Junda Huang, Hong Kong (CN); Yunhui Liu, Hong Kong (CN)

(73) Assignee: HONG KONG CENTRE FOR LOGISTICS ROBOTICS LIMITED, Hong Kong (CN)

( * ) Notice: Subject to any disclaimer, the term of this patent is extended or adjusted under 35 U.S.C. 154(b) by 195 days.

(21) Appl. No.: 18/447,334

(22) Filed: Aug. 10, 2023

(65) Prior Publication Data

US 2025/0052356 A1    Feb. 13, 2025

(51) Int. Cl.

| | | |
|---|---|---|
| *F16L 55/32* | (2006.01) | |
| *B63G 8/00* | (2006.01) | |
| *B63G 8/04* | (2006.01) | |
| *B63G 8/08* | (2006.01) | |
| *B63G 8/39* | (2006.01) | |
| *F16L 55/46* | (2006.01) | |
| *G01N 21/88* | (2006.01) | |

(Continued)

(52) U.S. Cl.
CPC ............. *F16L 55/32* (2013.01); *B63G 8/001* (2013.01); *B63G 8/04* (2013.01); *B63G 8/08* (2013.01); *B63G 8/39* (2013.01); *F16L 55/46* (2013.01); *G01N 21/8806* (2013.01); *G05D 1/0206* (2013.01); *H04N 23/56* (2023.01); *H04N 23/685* (2023.01); *B63G 2008/004* (2013.01); *F16L 2101/30* (2013.01); *G01S 15/89* (2013.01); *H04N 23/698* (2023.01)

(58) Field of Classification Search
CPC .... F16L 55/32; F16L 2101/30; H04N 23/685; H04N 23/56; H04N 23/698; B63G 8/001; B63G 8/04; B63G 8/08; B63G 8/39; G01N 21/8806; G05D 1/0206; G01S 15/89
USPC .......................................... 701/21
See application file for complete search history.

(56) References Cited

U.S. PATENT DOCUMENTS

| | | |
|---|---|---|
| 3,973,469 A | 8/1976 | Humen |
| 6,289,263 B1 | 9/2001 | Mukherjee |

(Continued)

FOREIGN PATENT DOCUMENTS

| | | |
|---|---|---|
| CN | 2692026 Y | 4/2005 |
| CN | 103726480 A | 4/2014 |

*Primary Examiner* — Mahmoud S Ismail
(74) *Attorney, Agent, or Firm* — EAGLE IP LIMITED

(57) ABSTRACT

In some embodiments, provided is a robot for water tunnel inspection, comprising: (a) a shell, comprising an upper shell and a lower shell; wherein the upper shell and the lower shell are sized and shaped to match each other, together defining a closed cavity therewithin; (b) a camera system, configured to capture an image or video of a field of view of surrounding; (c) a lighting system, configured to provide illumination at least partially for the field of view; (d) a propulsion system, configured to provide propulsion force to the robot in water; and (e) a controlling system, configured to provide power and control operation of the robot, wherein the robot is configured to float on water and to have a center of gravity positioned lower than geometric center. Other example embodiments are described herein. In certain embodiments, the robots provide safe and efficient tunnel inspections without human operation.

18 Claims, 12 Drawing Sheets

(51) Int. Cl.
*G05D 1/00* (2006.01)
*H04N 23/56* (2023.01)
*H04N 23/68* (2023.01)
*F16L 101/30* (2006.01)
*G01S 15/89* (2006.01)
*H04N 23/698* (2023.01)

(56) References Cited

U.S. PATENT DOCUMENTS

| | | |
|---|---|---|
| 8,028,660 B2 | 10/2011 | Troy |
| 8,099,189 B2 | 1/2012 | Kaznov et al. |
| 8,316,970 B1 | 11/2012 | Tran |
| 2006/0225634 A1 | 10/2006 | Cho et al. |
| 2015/0159846 A1* | 6/2015 | Hollinger ............... H05B 47/19 |
| | | 362/183 |
| 2018/0335176 A1* | 11/2018 | Wu ........................ B25J 18/00 |
| 2022/0234704 A1* | 7/2022 | Liu ........................ B63C 11/52 |
| 2024/0141611 A1* | 5/2024 | Tofte ..................... G01M 3/005 |

* cited by examiner

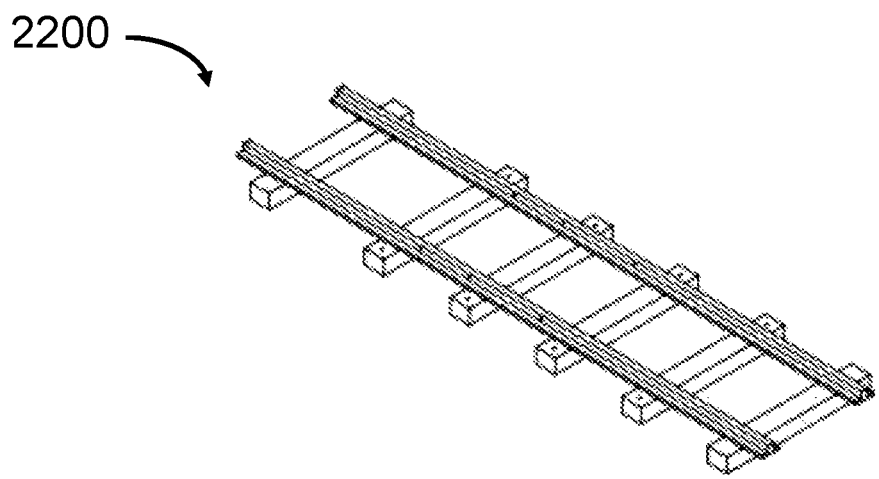
Fig.22A
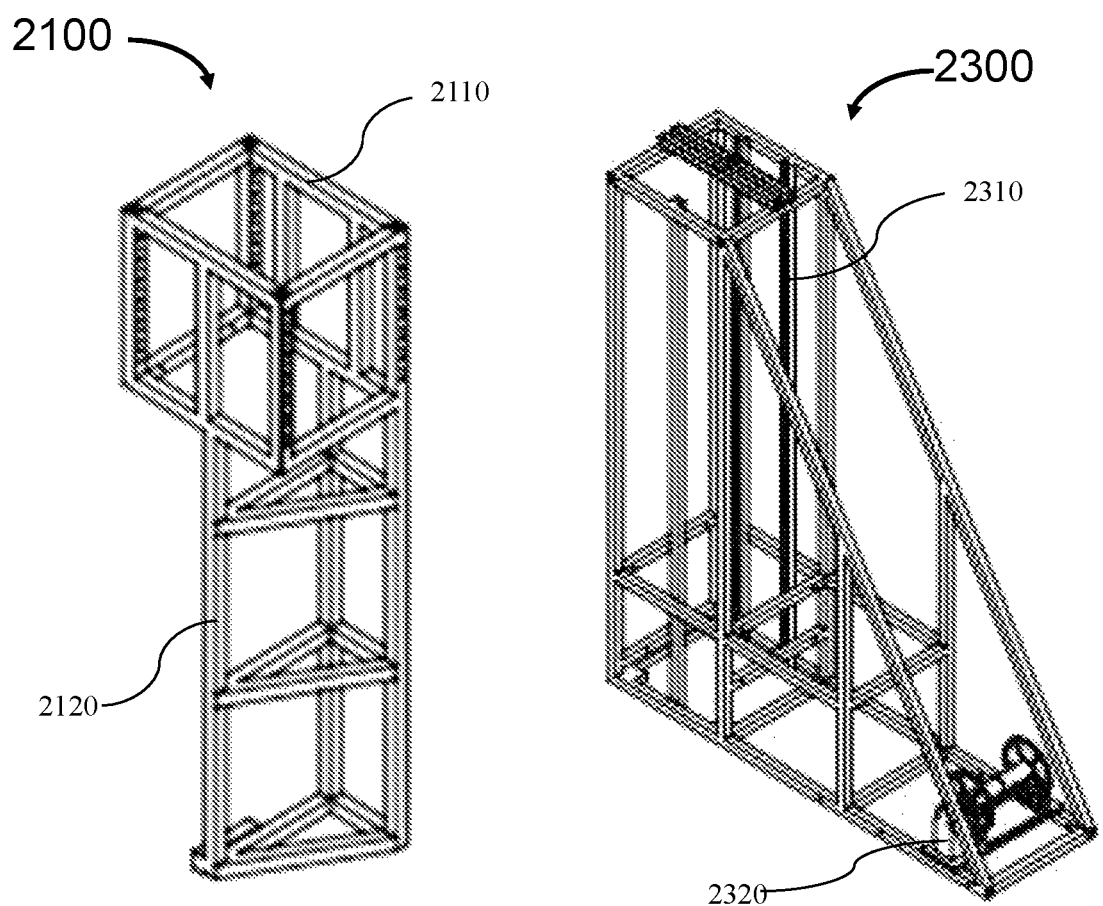
Fig.22B  Fig.22C

ROBOTS FOR WATER TUNNEL INSPECTION AND SYSTEMS THEREOF

FIELD OF INVENTION

This application relates to devices and systems for inspecting tunnels. More specifically, the present disclosure relates robots and system thereof for water tunnel inspection.

BACKGROUND OF INVENTION

Underground water tunnels are integral parts of a city's infrastructure and they are responsible for ensuring that the effluents from sewage treatment plants are safely discharged into the environment without causing harm to public health or the ecosystem. Without proper functioning of the water tunnels, untreated effluent could potentially contaminate waterways, polluting the surrounding environment and posing a significant risk to human and animal health. Additionally, underground water tunnels are critical components in managing water resources, ensuring that the treated effluents are effectively distributed to its destination while minimizing the impact on the environment. Therefore, proper maintenance and regular inspection of underground water tunnels are essential to ensure their effective operation, promoting the importance of innovation and engineering solutions for environmental sustainability.

Before the development of technologies, human beings (i.e., manual inspection) were the primary means of inspecting underground water tunnels. This process was extremely dangerous as it required individuals to be lowered into the tunnels with safety wire connections to visually detect any issues. However, this method is highly risky due to the unknown conditions within the tunnels, such as the presence of hazardous gases or volatile water flow, and the difficulty in escaping in the event of an emergency. With the advancement of technologies, remotely operated vehicles have been attempted for water tunnel inspections, but various problems have been encountered during long tunnel inspections because of harsh environments and unknown conditions, such as harsh illumination and impurities, within water tunnels. And limited access points etc. Therefore, there is a great need for alternative solutions that can ensure safety and efficiency of tunnel inspections, without human operation during the inspection.

SUMMARY OF INVENTION

In light of the foregoing background, in certain embodiments, it is an object to provide a tumbler robot inspection system, which is a cutting-edge solution specifically designed to address the challenges of inspecting water tunnels. In certain embodiments, the system consists of or includes a tumbler robot, which is engineered to move seamlessly in high-speed water flows, and a releasing and retrieving system. During the inspection process, the robot is released from an access point using the releasing and retrieving system.

Accordingly, in one aspect, provided is a robot for water tunnel inspection, comprising: a shell, a camera system, a lighting system, a propulsion system and a controlling system. The shell comprises an upper shell and a lower shell. The upper shell and the lower shell are sized and shaped to match each other, together defining a closed cavity therewithin. The camera system is configured to capture an image or video of a field of view of surrounding. The lighting system is configured to provide illumination at least partially for the field of view. The propulsion system is configured to provide propulsion force to the robot in water. The controlling system is configured to provide power and control operation of the robot. The robot is configured to float on water and to have a center of gravity positioned lower than geometric center, such that during operation, at least a portion of the upper shell is substantially maintained above the water, and at least a portion of the lower shell is substantially maintained under water.

In another aspect, provided is a system for water tunnel inspection, comprising a robot as claimed in any one of the preceding claims; and a releasing and retrieving system, configured to release the robot to, and retrieve from the water tunnel.

Other example embodiments will be described below.

There are many advantages of the present disclosure. In certain embodiments, the provided devices and systems thereof are designed to work autonomously, without human operation, as it can operate in harsh underground water tunnel environments and provide accurate and detailed inspection data without putting any human life at risk.

In certain embodiments, the provided devices and systems thereof provide unique design that ensures stability, with an arc-shaped structure that prevents the devices from getting stuck in the tunnel or in sediment and a low center of gravity that prevent the same from flipping over even in unknown environments. In certain embodiments, the camera system module features panorama camera and gimbal stabilizer that provide high-resolution video records of the tunnel, while the triple stabilization system for the camera ensures stable video capture.

In certain embodiments, once the inspection is completed, the robot is retrieved using the retrieving system, where it can be restored for the next assignment.

In certain embodiments, the tumbler robot and inspection system thereof provide a comprehensive and efficient solution for water tunnel inspections that is safer, more reliable, and less time-consuming than traditional inspection methods.

In certain embodiments, the tumbler robot and inspection system thereof represent a breakthrough solution for water tunnel inspections, leveraging innovative and efficient data collection capabilities without the need for human operation or wired connections. In certain embodiments, the seamless integration of the system's modules effectively overcomes the limitations of traditional inspection methods, while simultaneously enhancing the safety and efficiency of inspections. In certain embodiments, the system's reliable and efficient inspection capabilities enable the early identification of potential issues, facilitating timely maintenance and minimizing the risk of environmental hazards. With its pioneering design and advanced features, in certain embodiments, the tumbler robot inspection system has set a new standard for inspection technology, paving the way for a safer, cleaner, and healthier environment in the city and beyond.

In certain embodiments, the interior components of the robot work in tandem to enable the tumbler robot to perform efficient and reliable inspections in water tunnel environments, providing valuable data and contributing to the maintenance and safety of critical infrastructure.

In certain embodiments, the provided releasing and retrieving (RR) system is to ensure the success of the tunnel inspection by the robot, by enabling the safe and efficient operation of the tumbler robot for the inspection of water tunnel. The RR system enables the robot to be safely lowered into the tunnel for inspection and then retrieved back to the surface after completion. By implementing a robust and reliable RR system, in certain embodiments, the robot can be used to gather accurate and high-quality data for identifying defects or issues in the tunnel, ultimately ensuring the safe and efficient operation of the sewage treatment facilities. This system ensures that the robot can be operated in a controlled and safe manner, minimizing the risk of damage to the robot or to the tunnel itself.

BRIEF DESCRIPTION OF FIGURES

FIG. 22A is a perspective view of a sliding rail track of the RR system, according to an example embodiment.

FIG. 22B is a perspective view of a lifting frame of the RR system, according to an example embodiment.

FIG. 22C is a perspective view of a main frame of the RR system, according to an example embodiment.

DETAILED DESCRIPTION

Definitions

Figure 1:
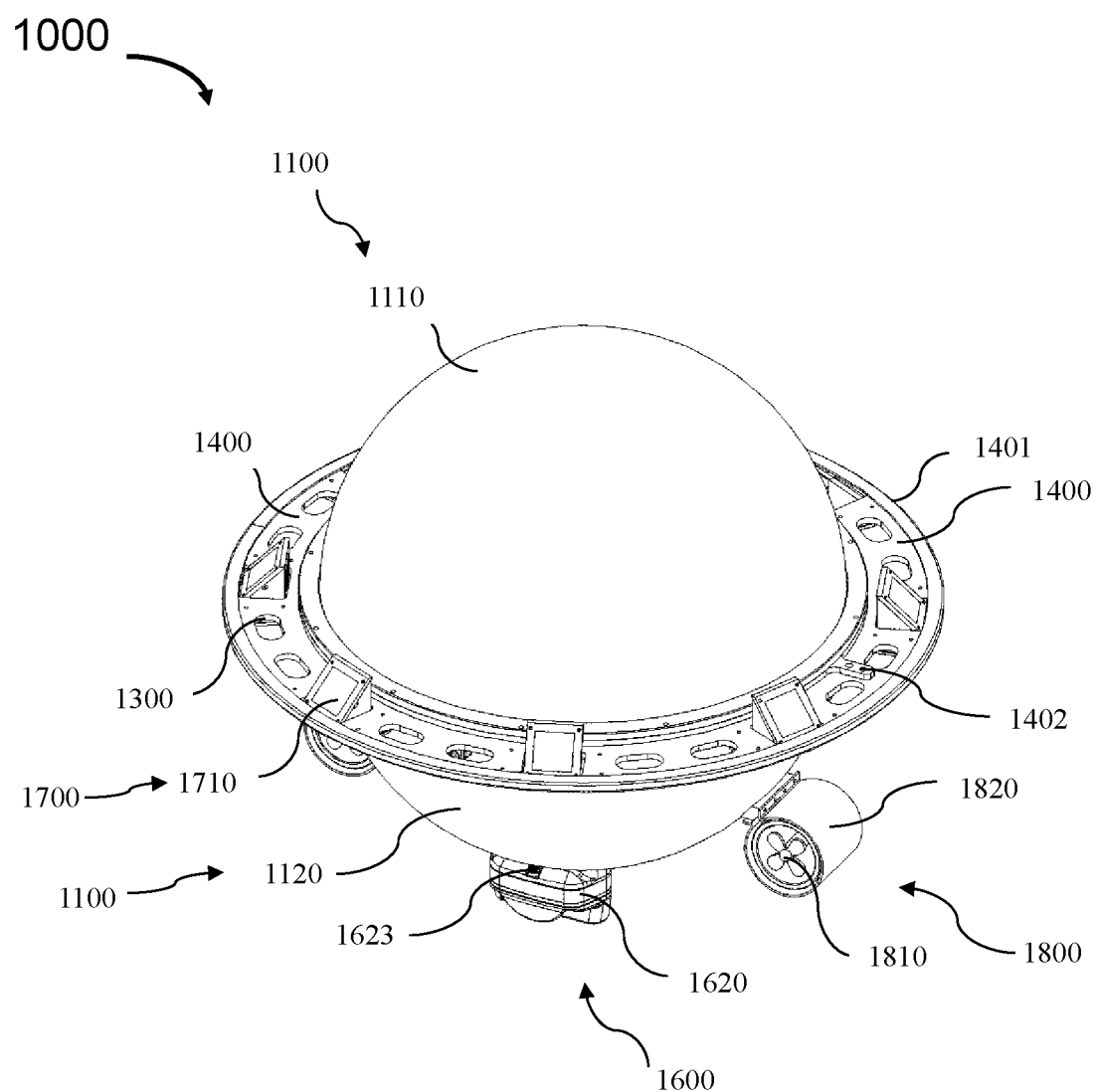
FIG. 1 is a perspective view of an example tumbler robot, according to an example embodiment.

As used herein and in the claims, the terms "comprising" (or any related form such as "comprise" and "comprises"), "including" (or any related forms such as "include" or "includes"), "containing" (or any related forms such as "contain" or "contains"), means including the following elements but not excluding others. It shall be understood that for every embodiment in which the term "comprising" (or any related form such as "comprise" and "comprises"), "including" (or any related forms such as "include" or "includes"), or "containing" (or any related forms such as "contain" or "contains") is used, this disclosure/application also includes alternate embodiments where the term "comprising", "including," or "containing," is replaced with "consisting essentially of" or "consisting of". These alternate embodiments that use "consisting of" or "consisting essentially of" are understood to be narrower embodiments of the "comprising", "including," or "containing," embodiments.

For the sake of clarity, "comprising", "including", "containing" and "having", and any related forms are open-ended terms which allows for additional elements or features beyond the named essential elements, whereas "consisting of" is a closed end term that is limited to the elements recited in the claim and excludes any element, step, or ingredient not specified in the claim.

For the sake of clarity, "characterized by" or "characterized in" (together with their related forms as described above), does not limit or change the nature of whether the list of terms following it are open or closed. For example, in a claim directed towards "a device comprising A, B, C, and characterized by D, E, and F", the elements D, E, and F are still open-ended terms and the claim is meant to include other elements due to the use of the word "comprising" earlier in the claim.

As used herein, the singular forms "a", "an" and "the" are intended to include the plural forms as well, unless the context clearly indicates otherwise. Where a range is referred in the specification, the range is understood to include each discrete point within the range. For example, 1-7 means 1, 2, 3, 4, 5, 6, and 7.

As used herein, the term "about" is understood as within a range of normal tolerance in the art and not more than ±10% of a stated value. By way of example only, about 50 means from 45 to 55 including all values in between. As used herein, the phrase "about" a specific value also includes the specific value, for example, about 50 includes 50. As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" cylindrical shape would mean that the object has either an exact cylindrical shape or a nearly exact cylindrical shape. In another example, an object that is "substantially" perpendicular to a surface would mean that the object is either exactly perpendicular to the surface or nearly exactly perpendicular to the surface, e.g., has a 5% deviation.

It is to be understood that terms such as "top", "upper", "bottom", "lower", "middle", "side", "length", "inner", "outer", "interior", "exterior", "outside", "vertical", "horizontal" and the like as may be used herein, merely describe points of reference and do not limit the present invention to any particular orientation or configuration. Further, terms such as "first," "second," "third," etc., merely identify one of a number of portions, components and/or points of reference as disclosed herein, and likewise do not limit the present invention to any particular configuration or orientation.

As used herein and in the claims, the term "connect" refers to directly or indirectly linking or joining two or more elements or systems together, either physically, electronically or functionally.

As used herein and in the claims, the term "attach" refers to link or connect one object to another, using some form of physical or mechanical connection, or to make fast, such as by tying or gluing, etc.

As used herein and in the claims, the term "fix" refers to link or connect one object to another securely, using some form of physical or mechanical connection, or to make firm, stable, or stationary of an object(s) to another.

As used herein and in the claims, the terms "robot", or "tumbler robot" are interchangeable, and refer to a device designed to move through a tunnel and perform inspection tasks automatically such as collecting an image or video of the tunnel surrounding. In some examples, the robot is configured to float on water and has a low center of gravity that prevents it from flipping over, and thus can be described as tumbler.

As used herein and in the claims, the term "image" are visual signal or information that covers both one or more moving pictures (videos) and/or one or more still pictures alike. A signal or information representing an image or a video will be sometimes referred to herein as "imaging data" or "data". For clarity's sake, data may also include other types of signal or information.

As used herein and in the claims, the term "camera" refers to a device that captures images and/or videos and optionally recording the captured images or videos. In some examples, the camera contains built-in image stabilizing systems or algorithms.

As used herein and in the claims, the term "center of gravity" is the point in an object or system where the weight of the object or system can be considered to be concentrated, determining the object's balance and stability.

As used herein and in the claims, the term "electronic speed controller (ESC)" is a component that regulates the speed and/or direction of an electric motor (such as underwater motor) based on signals received from controlling system.

As used herein and in the claims, the term "geometric center" of an object or system is the point that represents the average location of all the points in the object or system.

As used herein and in the claims, the term "tunnel" or "water tunnel" refers to a structure such as pipes or channels that may be used for transporting water, wastewater or sewage water or the like. In some examples, the tunnel may be underground. The term water refers to liquids that contains water, water bodies or alike, or wastewater that may or may not include a variety of contaminants and pollutants, and may include semi-solids or solids.

As used herein and in the claims, the term "operatively connects with" or "operatively connects to" refers to a functional or operational connection between two components or systems that allows them to work together or interact with each other in a specific manner. Such connection may be direct or indirect.

As used herein and in the claims, "edge" refers to a boundary of a closed curve. In some examples, the edge of an opening refers to the physical boundary of an outer-shell that forms the circumference of the opening. Although the description referred to particular embodiments, the disclosure should not be construed as limited to the embodiments set forth herein.

The use of "adapted to" or "configured to" herein is meant as open and inclusive language that does not foreclose devices adapted to or configured to perform additional tasks or steps.

NUMBERED EMBODIMENTS

1. A robot for water tunnel inspection, comprising:
   (a) a shell, comprising an upper shell and a lower shell; wherein the upper shell and the lower shell are sized and shaped to match each other, together defining a closed cavity therewithin;
   (b) a camera system, configured to capture an image or video of a field of view of surrounding;
   (c) a lighting system, configured to provide illumination at least partially for the field of view;
   (d) a propulsion system, configured to provide propulsion force to the robot in water; and
   (e) a controlling system, configured to provide power and control operation of the robot,
   wherein the robot is configured to float on water and to have a center of gravity positioned lower than geometric center, such that during operation, at least a portion of the upper shell is substantially maintained above the water, and at least a portion of the lower shell is substantially maintained under water.

2. The robot of embodiment 1, further comprising an inertial measurement unit (IMU) operatively connected with the controlling system.

3. The robot of any one of preceding embodiments, wherein the upper shell is at least partially transparent.

4. The robot of any one of preceding embodiments, wherein density of the lower shell is higher than that of the upper shell.

5. The robot of any one of preceding embodiments, wherein the camera system further comprising:
   a panorama camera that provides a panoramic image of the surrounding; and/or
   an underwater sonar that captures an underwater image.

6. The robot of any one of preceding embodiments, further comprising an image stabilizing system that operatively connects with the camera system to improve stability of the image.

7. The robot of embodiment 6, wherein the image stabilizing system comprises: an image stabilization module that stabilizes the image from the panorama camera; and/or a gimbal stabilizer module that is operatively connected with the panorama camera.

8. The robot of any one of preceding embodiments, wherein the controlling system further comprises a power supply system and a processing unit.

9. The robot of embodiment 8, wherein the power supply system comprises a rechargeable battery and a voltage regulator.

10. The robot of any one of preceding embodiments, wherein the propulsion system further comprises an underwater motor attached on the lower shell.

11. The robot of embodiment 10, wherein the underwater motor is operatively connected with an electronic speed controller.

12. The robot of any one of preceding embodiments, further comprising a base plate, sized and shaped to attach with the shell.

13. The robot of any one of preceding embodiments, wherein the lighting system further comprises a plurality of LED modules that are disposed on the base plate.

14. The robot of embodiment 13, wherein individual LED module comprises a LED array, a heat sink and a waterproof LED shell.

15. The robot of any one of preceding embodiments, wherein the overall shape of the shell is substantially spherical.

16. A tumbler robot for water tunnel inspection, comprising:
  (a) a spherical shell, comprising an upper shell and a lower shell;
    wherein the upper shell and the lower shell are sized and shaped to match each other, together defining a closed cavity therewithin;
  (b) a camera system, configured to capture an image or video of a field of view of surrounding;
  (c) a lighting system, configured to provide illumination at least partially for the field of view;
  (d) a propulsion system, configured to provide propulsion force to the robot in water;
  (e) a controlling system, configured to provide power and control operation of the robot;
  (f) an inertial measurement unit (IMU), operatively connected with the controlling system; and
  (g) a base plate, attached to the shell,
  wherein the camera system further comprising:
two vs that are orthogonally arranged to provide a panoramic image of the surrounding;
a gimbal stabilizer that is operatively connected with the two panorama cameras; and
an underwater sonar that captures an underwater image;
  wherein the lighting system further comprises a plurality of LED modules that are disposed on the base plate;
  wherein the propulsion system further comprises two underwater motors attached on the lower shell; and
  wherein the robot is configured to float on water and to have a center of gravity positioned lower than geometric center, such that during operation, at least a portion of the upper shell is substantially maintained above the water, and at least a portion of the lower shell is substantially maintained under water.

17. A system for water tunnel inspection, comprising:
  a robot as described in any one of the preceding embodiments; and
  a releasing and retrieving system, configured to release the robot to, and retrieve from the water tunnel.

18. The system of embodiment 17, wherein the releasing and retrieving system comprises:
  a lifting frame, configured to receive the robot;
  a sliding rail track, configured to be fixable on a substrate;
  a main frame, configured to at least partially receive the lifting frame and to be movable along the sliding rail track; and
  a winch system, configured to be connectable with the robot,
  wherein the winch system is configured to release the robot to, and retrieve from the water tunnel.

19. The system of embodiment 18, wherein the lifting frame is configured to be switchable between an upper position and a lower position relative to the main frame, such that the robot is lifted from or lowered towards the water tunnel, respectively.

20. The system of embodiment 17 or embodiment 18, wherein the main frame is configured to be switchable between a working position and a preparing position relative to the sliding rail track, such that the robot is moved closer to or away from the water tunnel, respectively.

EXAMPLES

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Overview of the System Architecture

In certain embodiments, the tumbler robot and system thereof are complex and multi-functional systems designed to perform tunnel inspection such as in underground water tunnels. In certain embodiments, it contains various subsystems, including the structural shells, lighting system, camera system, rotation stabilization system, power supply system, supportive designs, and releasing and retrieving (RR) system, etc.

Description of the Major Subsystems

In certain embodiments, the structural shells, which consist of or contains an upper shell, a base plate with an impact-resistant rubber, and a lower shell. These structures are used for protecting the electronic components of the robot from water damage and collision. In some embodiments, the upper shell is made of transparent and hard materials such as acrylic, providing transparency and durability for the interior camera system. In some embodiments, the base plate is fabricated from metals or alloys such as aluminum alloy, offering a lightweight yet sturdy foundation for the placement of LED modules within the lighting system. In some embodiments, the lower shell is made of metals or alloys such as stainless steel, providing the necessary strength and impact resistance to protect the electronics.

In certain embodiments, the lighting system is configured to provide illumination for the camera system to capture high-quality video footage. In certain embodiments, the lighting system includes eight high-power LED module that are substantially, equidistantly positioned on the base plate, around the circumference of the robot to provide uniform illumination across the entire field of view of the camera. In certain embodiments, each LED module is embedded with a heat sink and connected to a heat dissipation plate to prevent heat from transmitting into the inspection robot.

In certain embodiments, the camera system is configured to capture high-resolution video footage of the tunnel interior. In certain embodiments, the camera system includes two high-resolution panorama cameras that can provide a panoramic view without blind spots, a gimbal stabilizer, and a underwater sonar that captures precise and detailed underwater image. This configuration ensures a comprehensive video capture regardless of the tunnel's harsh conditions.

In certain embodiments, the rotation stabilization system is designed to address the six degrees of freedom motion and sudden changes in speed due to various jolts and collisions encountered in the tunnel. In certain embodiments, the rotation stabilization system includes a triple stabilization system that consists of or contains a camera's built-in video stabilization algorithms, a high-performance three-axis rotation gimbal stabilizer algorithm, and an underwater propulsion system. It includes two underwater motors with Electronic Speed Controllers (ESCs), an Inertial Measurement Unit (IMU), and an industrial computer to resist the yaw rotation of the tumbler robot and keep it stable in high-speed water flow.

In certain embodiments, the power supply system provides power control of the tumbler robot. In certain embodiments, the power supply system contains a rechargeable battery pack and voltage regulator. In certain embodiments, the battery pack provides energy for at least the lighting system and rotation stabilization system of the robot. In certain embodiments, the voltage regulator is responsible for distributing the voltage from the battery pack to the subsystems of the tumbler robot.

In certain embodiments, the above mentioned modules (including the lighting system, the camera system, the rotation stabilization system, the power supply system) are constructed and arranged to provide the best position of the center of mass to improve the control performance and topple resistance capability of the robot. In certain embodiments, a sealing rubber is optionally employed to effectively seal the connection between the upper shell and the base plate, providing a watertight seal. In certain embodiments, waterproof gaskets and sealants are optionally applied to screw openings, and a pressure relief valve is used to control the pressure inside the robot and prevent damage due to potential battery pack failure. Waterproof connectors facilitate convenient data transmission and debugging processes. Mechanical fasteners are provided ensure security during the releasing and retrieval procedure of the robot.

In certain embodiments, the provided system contains the robot and additionally a RR system, providing a safe and efficient means of lowering the robot into the tunnel for inspection and retrieving it back to the surface. In certain embodiments, the RR system contains a sliding rail track, a main frame, a lifting frame, and a winch system. The structural components (a sliding rail track, a main frame, a lifting frame) provide a stable and secure platform for the robot to move vertically and horizontally, while the winch system provides the necessary force to release and retrieve the robot. In certain embodiments, the RR system is designed to withstand the harsh environment of the tunnel while ensuring the safety of personnel and the environment.

Example 1

FIGS. 1-19 show an example device 1000 for water tunnel inspection. The example robot 1000 contains various interconnected subsystems that collaborate to achieve efficient and innovative data collection in water tunnel inspections. The robot 1000 generally contains a shell 1100, a camera system 1600, a lighting system 1700, a propulsion system 1800 and a controlling system 1900. FIGS. 1-5 show different views of the overview of the example robot 1000. FIGS. 6-9 show the interior components inside the robot 1000 after the upper shell 1110 is removed. FIGS. 10-14 show the supporting elements after the upper shell 1110, the camera system 1600 and controlling system 1900 are removed. FIG. 15 shows the lower shell 1120, the sealing rubber ring 1124 and fiberglass plate 1300 of the tumbler robot, with the base plate 1400 removed. FIGS. 16-19 show the details of LED module 1710, camera system 1600 and motor, respectively. Details of each component will be described in more detail below.

Shell

FIGS. 1-5 show a perspective view of the tumbler robot 1000. The shell 1100 is formed from an upper shell 1110 and a lower shell 1120, which provides safeguarding and support for the robot's interior components such as electronic elements from water/moisture damage and collisions, and also provides a support for fixing or attaching various exterior components, such as the base plate 1400, lighting system 1700 and propulsion system 1800, etc. The upper shell 1110 and the lower shell 1120 are sized and shaped to fit for engaging with each other, together defining a closed cavity therewithin. The closed cavity is a substantially watertight compartment used for accommodating the interior components of the robot, such as panorama cameras 1610 of the camera system 1600 and the controlling system 1900.

In this example, the upper shell 1110 and the lower shell 1120 are generally hemispherical-shaped, thereby forming a generally spherical-shaped shell when they are connected with each other. The engaging edges of the upper shell 1110 and the lower shell 1120 are configured to match each other. In this example, the upper shell 1110 is made of acrylic and is substantially transparent, allowing the camera system 1600 disposed within the shell to capture an image or video of a field of view of surrounding. The upper shell 1110 acts as a protective outer layer, shielding the interior components from external elements. In this example, the lower shell 1120 is made of stainless steel. Such combination of using a plastic upper shell 1110 and a metal lower shell 1120 makes the overall shell has a center of gravity closer to the lower shell 1120 than the upper shell 1110, and thus lower than the geometric center. Now referring to FIG. 15, additionally, the lower shell 1120 includes a sealing rubber 1124 ring along the open end to seal the engaging edges between the upper shell 1110 and the lower shell 1120, thereby enhancing water resistance, safeguarding the interior components from potential damage caused by water infiltration.

Figure 4:
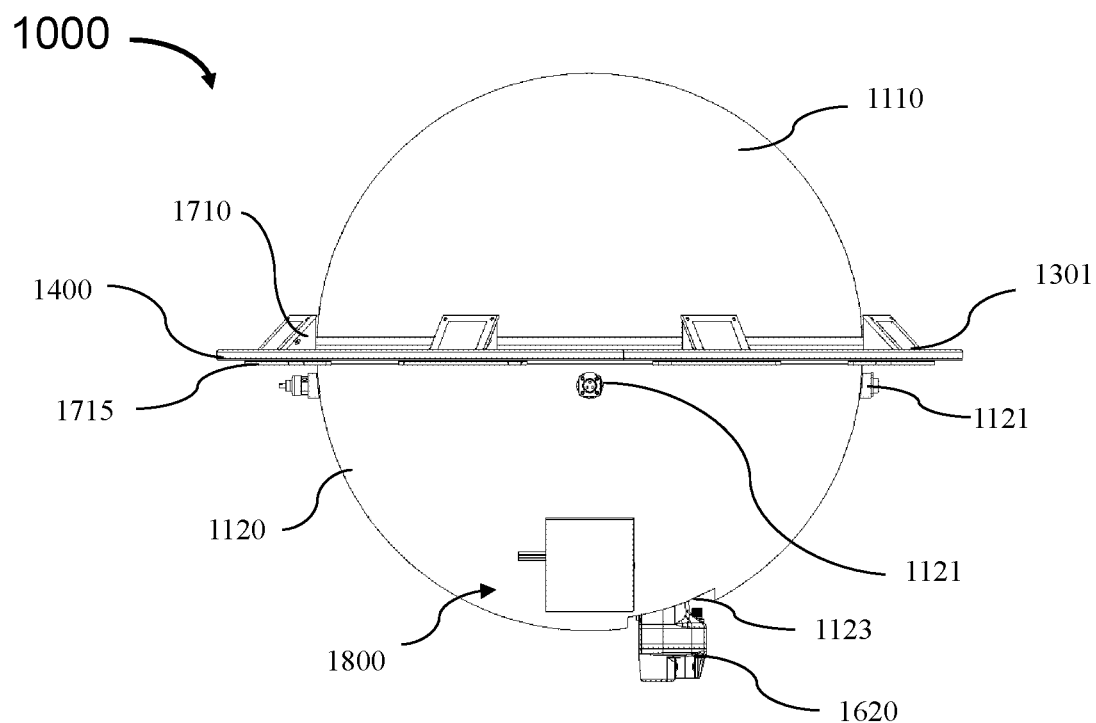
FIG. 4 is a left view of the tumbler robot, according to the same example embodiment of FIG. 1.
Figure 5:
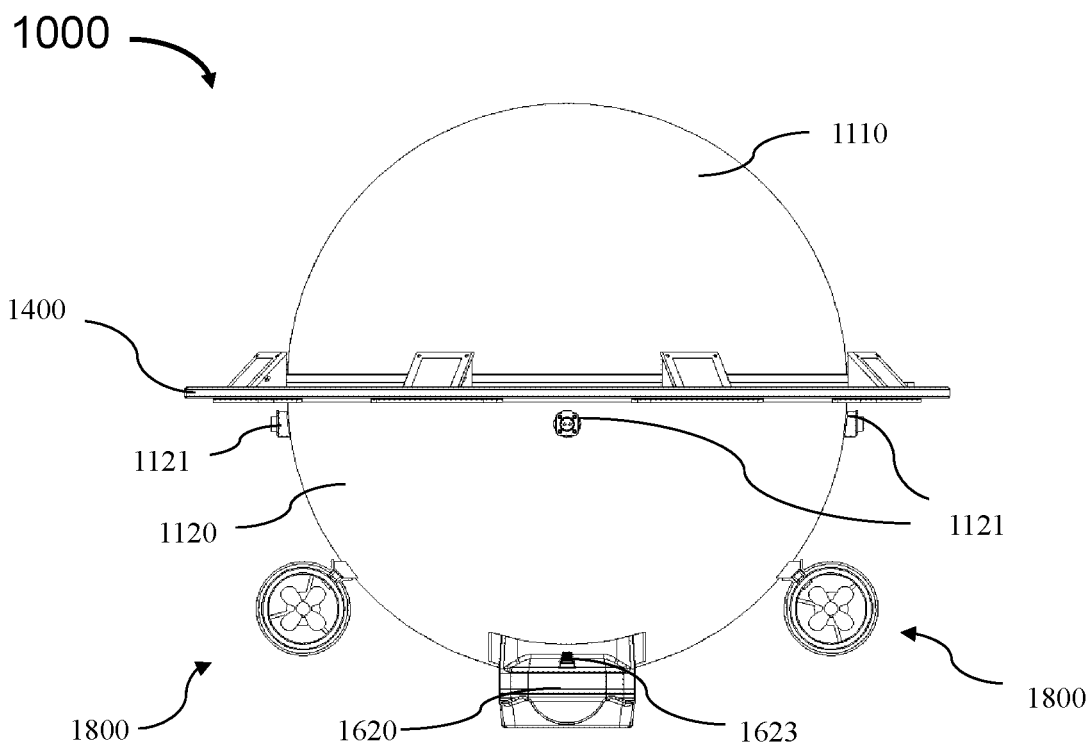
FIG. 5 is a front view of the tumbler robot, according to the same example embodiment of FIG. 1.

Now referring to FIGS. 4-5, the lower shell 1120 further comprises multiple waterproof connectors 1121 that are disposed closer to the open end of the lower shell 1120, beneath the base plate 1400 when installed. In this example, the lower shell 1120 of the robot houses three waterproof connectors 1121 that are evenly distributed and are configured to operatively and electronically connect with the interior electronic components such as the controlling system 1900. These connectors 1121 serve the purpose of debugging and transmitting collected data from the robot to external devices. Such positioning of the waterproof connectors 1121 on the lower shell 1120, beneath the base plate 1400, facilitates convenient access and reliable data transfer from the robot 1000.

Figure 12:
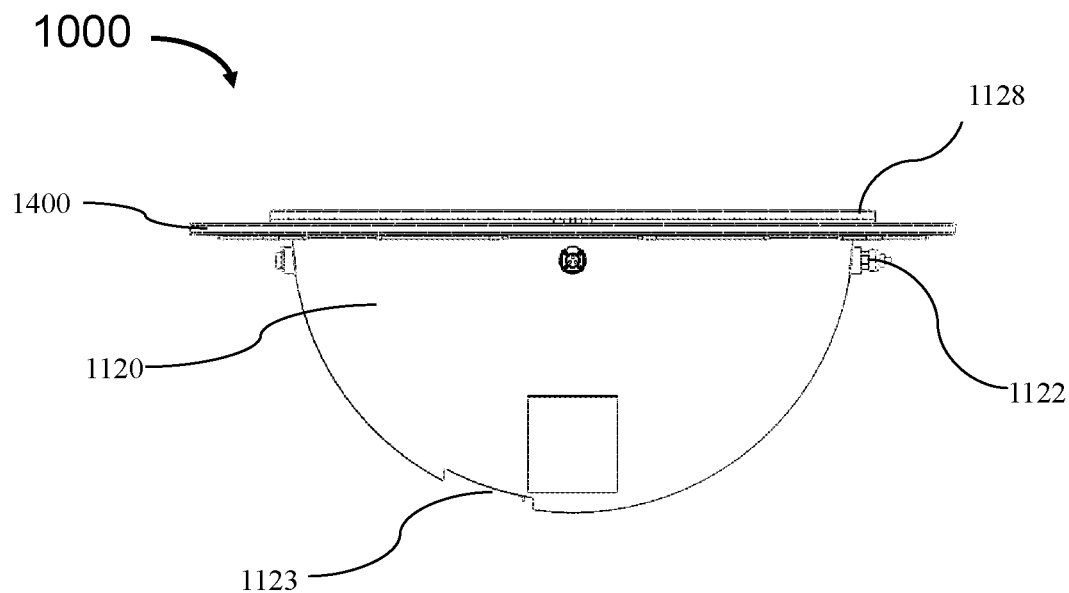
FIG. 12 is a right view of the main metal structure of the tumbler robot, according to the same example embodiment of FIG. 1.

Now referring to FIG. 12, showing the right view of the metal structure (including the lower shell 1120) of the tumbler robot 1000. The lower shell 1120 further contains a pressure relief valve 1122 that is disposed closer to the open end of the lower shell 1120 and below the base plate 1400, facing parallel to the underwater motors 1810. The pressure relief valve 1122 controls the pressure inside the robot and prevents damage due to potential battery pack 1910 failure. The lower shell 1120 further contains an empty space 1123 which is designed for housing the underwater sonar 1620.

Figure 13:
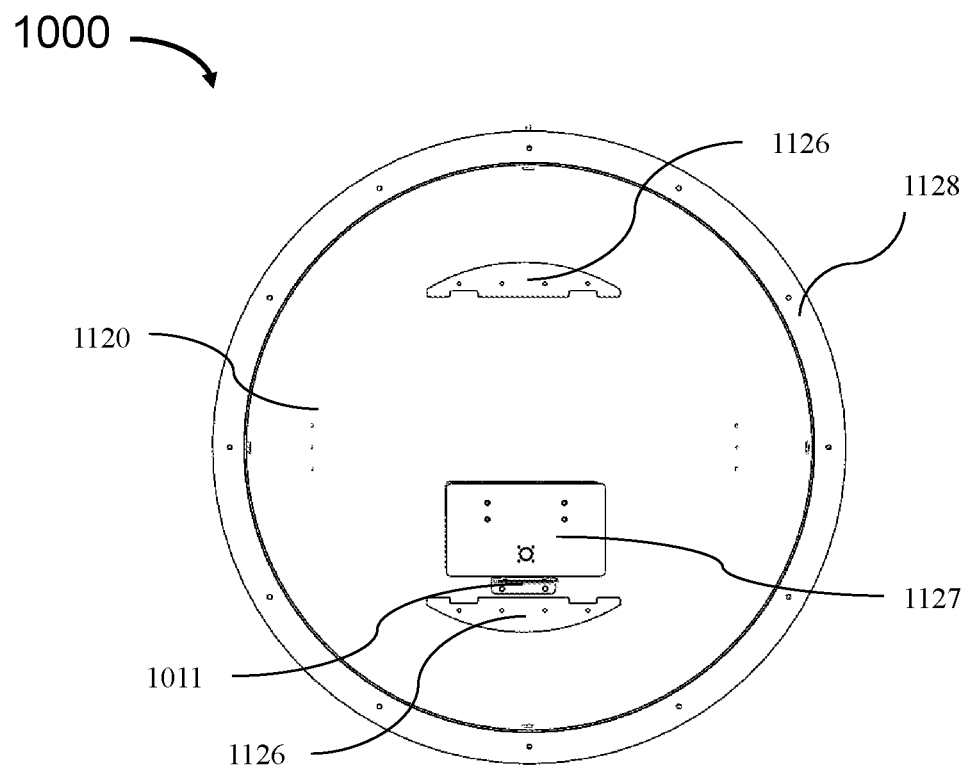
FIG. 13 is a top view of the lower shell of the tumbler robot, according to the same example embodiment of FIG. 1, showing two metal connectors are designed to secure the partition plate in the lower shell.
Figure 14:
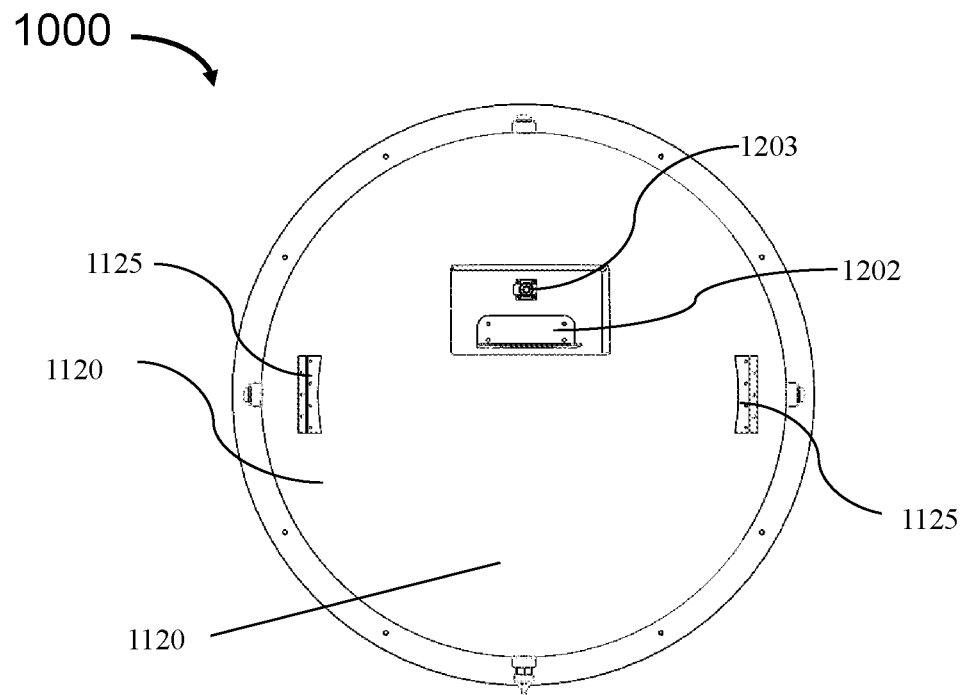
FIG. 14 is a bottom view of the lower shell of the tumbler robot, according to the same example embodiment of FIG. 1.
Figure 15:
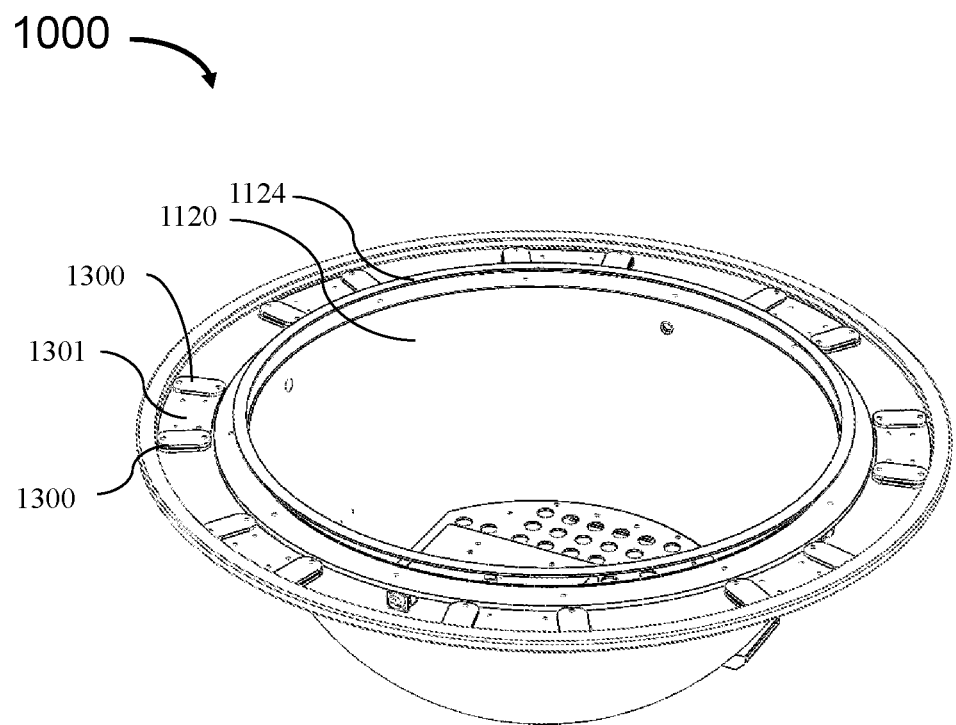
FIG. 15 is a perspective view of the lower shell of the tumbler robot, according to the same example embodiment of FIG. 1, the sealing rubber ring and fiberglass plate of the tumbler robot, with base plate removed.

Now referring to FIGS. 12-14, the lower shell 1120 further contains a lip portion 1128 horizontally extended away from the open end. The lip portion 1128 is configured to engage with the upper shell 1110 and attaching or fixing the base plate 1400, respectively.

Now referring to FIG. 13, showing the top view of the lower shell 1120 of the tumbler robot, with the partition plate 1200 removed. Two metal partition plate connectors 1126 are provided in the interior of the lower shell 1120, configured to fix a partition plate 1200 to the lower shell 1120, ensuring structural stability and integrity. IMU connector 1011 that is configured to connect the IMU 1010 and an empty space 1127 are also provided in the interior of the lower shell 1120.

FIG. 14 shows the bottom view of the lower shell 1120 of the example robot 1000. Two underwater motor connectors 1125 are provided on the lower shell 1120 and configured to attach the protective shells of the underwater motors 1810, respectively.

Other Supporting Structures

Figure 10:
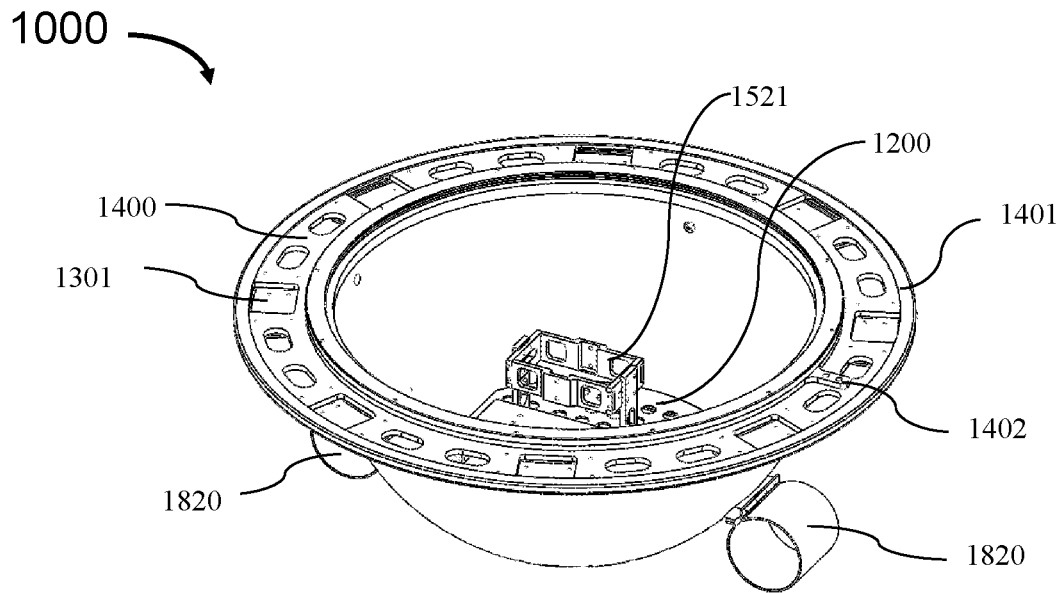
FIG. 10 is a perspective view of the main metal structure of the tumbler robot, according to the same example embodiment of FIG. 1.
Figure 11:
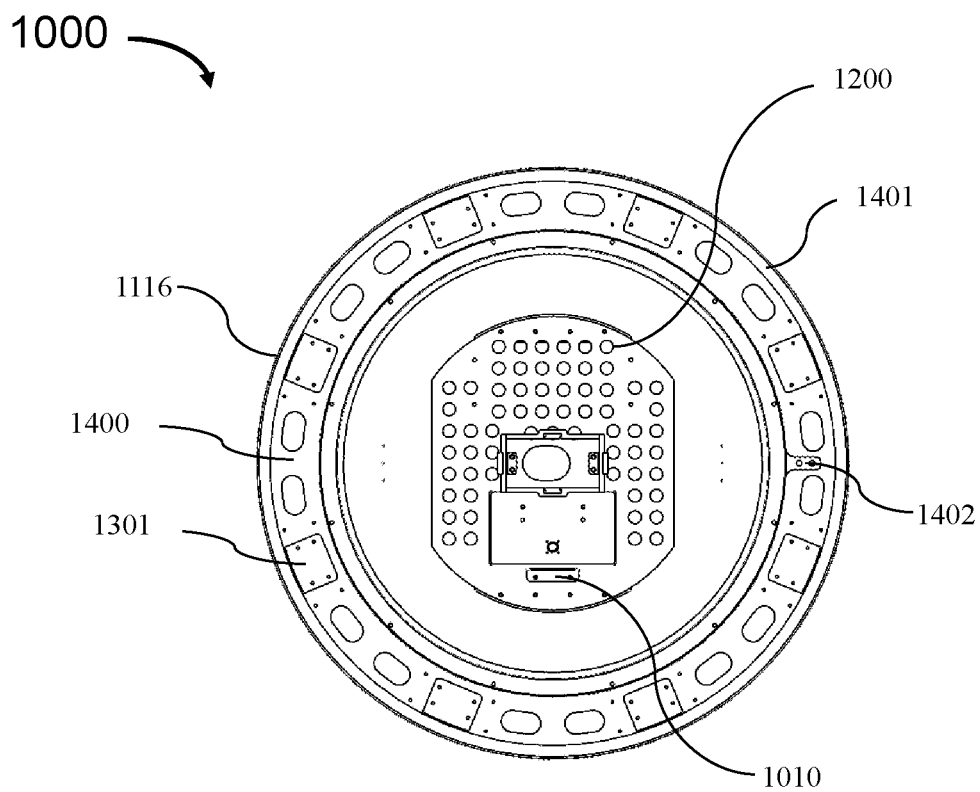
FIG. 11 is a top view of the main metal structure of the tumbler robot, according to the same example embodiment of FIG. 1, showing a gimbal stabilizer connector is horizontally installed on the partition plate.

FIGS. 10-11 show the main supporting structures of the tumbler robot. In addition to the shell, the main supporting structures contain a base plate 1400, a partition plate 1200, multiple heat-dissipation plates 1301, an underwater motor protective frame 1820, and a gimbal stabilizer connector 1521. In this example, these main supporting structures (except the upper shell 1110) are made of metals or alloys. Additionally, the main supporting structures contains a controlling system connector that facilitates a stable connection between the metal structure (partition plate 1200) and the controlling system 1900, enabling a stable operation of the robot. In this example, the controlling system connector is or contains an industrial computer connector and the controlling system 1900 is or contains an industrial computer 1920. The careful design and arrangement of these main supporting structures guarantee the structural integrity of the tumbler robot.

Base Plate

FIGS. 1-7, 10-12 show the base plate 1400 connected with the lower shell 1120 of the robot. In this example, the base plate 1400 is generally a ring-shaped metal sheet containing multiple holes to minimize weight while maintaining structural integrity. In this example, the base plate 1400 is made of aluminum alloy. The base plate 1400 is sized and shaped to match the outer rim close to or at the open end of the lower shell 1120. The base plate 1400 further contains a mechanical fastener 1402 configured to connect with a rope for the RR system. The base plate 1400 serves as a robust foundation, providing stability and support to the entire structure of the robot. In this example, an impact-resistant rubber 1401 ring is provided which is attached around the outer rim of the base plate 1400, to provide additional protection for the robot 1000. The base plate 1400 contributes to the structural integrity of the robot and provides support to the lighting system 1700. The base plate 1400 also provides support to the lighting system 1700. In this example, the lighting system 1700 is disposed on the base plate 1400.

Partition Plate

FIGS. 7, 9-11 show the partition plate 1200, which is one of the interior components that provides structural support and organization for other interior components within the robot. In this example, the partition plate 1200 is a flat metal sheet containing multiple holes, being horizontally positioned inside the lower shell 1120 of the tumbler robot. In this example, the partition plate 1200 is fixed onto the lower shell 1120 by two partition plate connectors 1126 (FIG. 13). The horizontally positioned partition plate 1200 serves as a fundamental reference point or support, ensuring a stable and level base for the other systems or components within the robot. For example, the controlling system 1900 including the battery pack 1910 and industrial computer 1920 are fixed to the partition plate 1200. The strategic positioning of the battery pack 1910 and industrial computer 1920 onto the partition plate 1200 guarantees that the weight distribution is centered directly beneath the robot's geometry center, promoting optimal stability and balance during operation. The partition plate 1200 also helps organizing and segregating the interior components, ensuring an efficient layout of the interior components.

In this example, the partition plate 1200 further contains an empty space 1127 for housing an underwater sonar, facilitating the installation and placement of the underwater sonar. The partition plate 1200 further connects with an IMU connector 1011 (FIG. 13) which is configured and positioned to facilitate the connection of the IMU 1010 to the partition plate 1200.

FIGS. 10-11 show the top view of the metal structure of the tumbler robot 1000. The gimbal stabilizer connector 1521 is sized and shaped to connect with gimbal stabilizer 1520 and is horizontally installed on the partition plate 1200, with an opening below for placing the underwater sonar. The gimbal stabilizer connector 1521 serves as the connecting element that integrates the gimbal stabilizer 1520, securely attaching it to the partition plate 1200 and thus to the robot. Below the gimbal stabilizer connector 1521, there is a designated empty space 1123 that accommodates the placement of the underwater sonar, ensuring optimal positioning for capturing precise underwater imaging data.

Other Interior Components

FIGS. 6-11 show various views of the interior of the example robot 1000, with the upper shell 1110 removed. In addition to the partition plate 1200, the interior of the tumbler robot includes various interior components, including the controlling system 1900 and part of the camera system 1600. For example, interior components include panorama cameras 1610, three batteries, two ESCs 1930 for underwater motors 1810, an industrial computer 1920, an IMU 1010, etc. Details will be described further in detail below.

Camera System

FIGS. 6-9 and 18 show the camera system 1600 of the example robot 1000. In this example, the camera system 1600 contains one or more panorama cameras 1610, which are connected through the panorama camera connector 1611, which is further connected with a three-axis rotation gimbal stabilizer 1520, ensuring stable and high-resolution image (or video) capture. In this example, the image capture is a video capture. The camera system 1600 is operatively connected with the controlling system 1900. In some examples, the camera system 1600 is configured to capture clear 3k resolution videos of the tunnel at about 60 FPS. In some examples, the panorama cameras 1610 in the camera system 1600 contains built-in stabilizing algorithms and is regarded as image stabilization module, a part of the rotation stabilization system.

Figure 8:
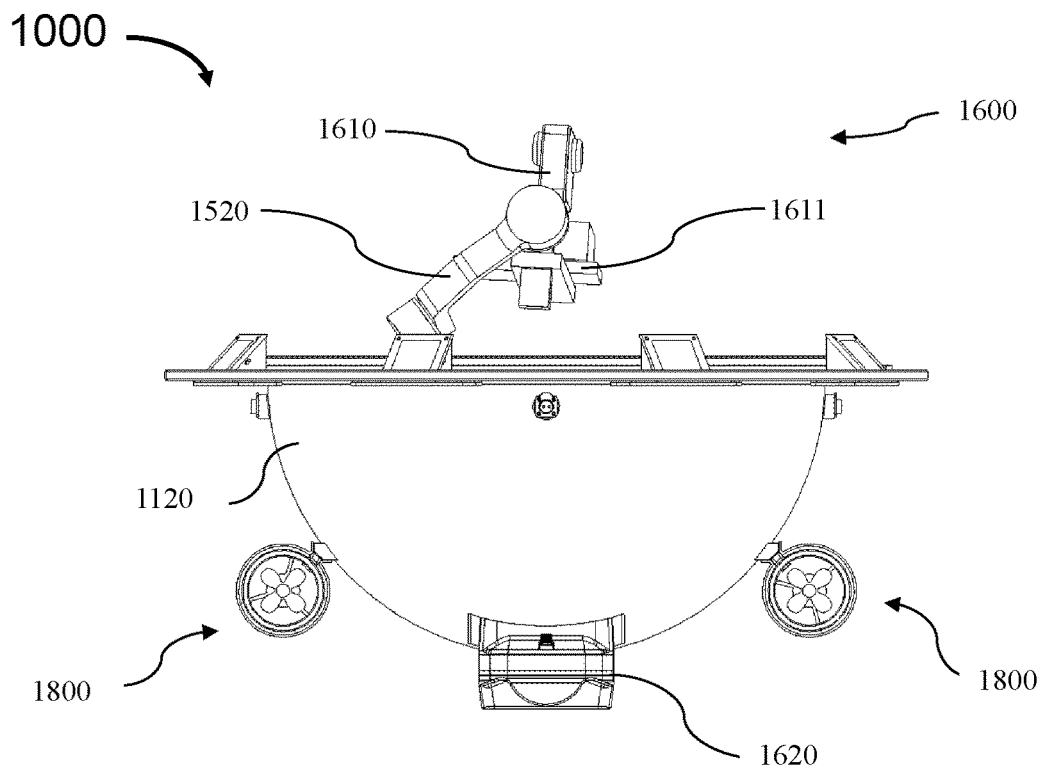
FIG. 8 is a front view of the interior of the tumbler robot, according to the same example embodiment of FIG. 1.

Now referring to FIG. 8, the gimbal stabilizer 1520 is connected to the partition plate 1200 by a gimbal stabilizer connector 1521. In this example, the camera system 1600 contains two high-performance panorama cameras 1610 strategically positioned to capture a wide field of view. To ensure stable and steady footage, a gimbal stabilizer 1520 is employed, which is connected to the panorama cameras 1610 by the panorama camera connector 1611, ensuring a secure attachment while allowing for smooth movement and adjustment. The gimbal stabilizer 1520 is positioned near the center of gravity of the robot, enhancing balance and minimizing camera vibrations during operation. In some examples, the gimbal stabilizer 1520 is regarded as a gimbal stabilizer module, part of the rotation stabilization system.

Figure 9:
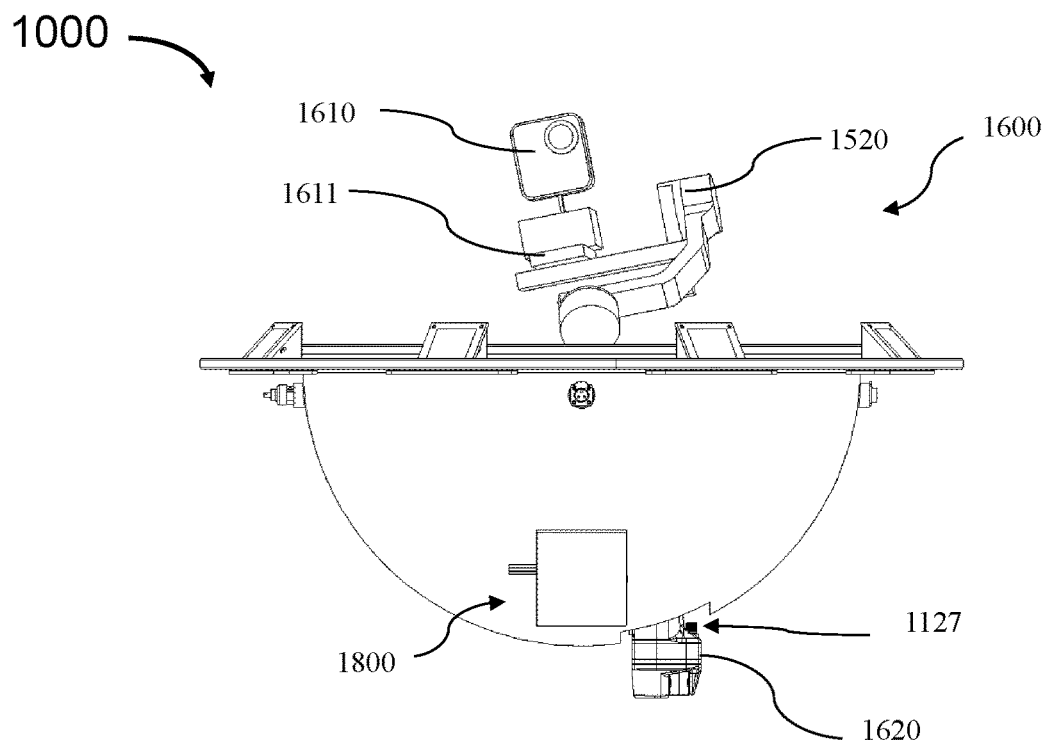
FIG. 9 is a left view of the interior of the tumbler robot, according to the same example embodiment of FIG. 1.

Now referring to FIG. 9, the two panoramic cameras are positioned orthogonally to provide a comprehensive, panoramic view to avoid blind spots. This configuration enables the robot to capture a wide range of visual data during inspections. The two panorama cameras 1610 are connected to the gimbal stabilizer 1520 through the specialized panorama camera connector 1611, ensuring precise alignment and stability of the cameras during operation.

Figure 18:
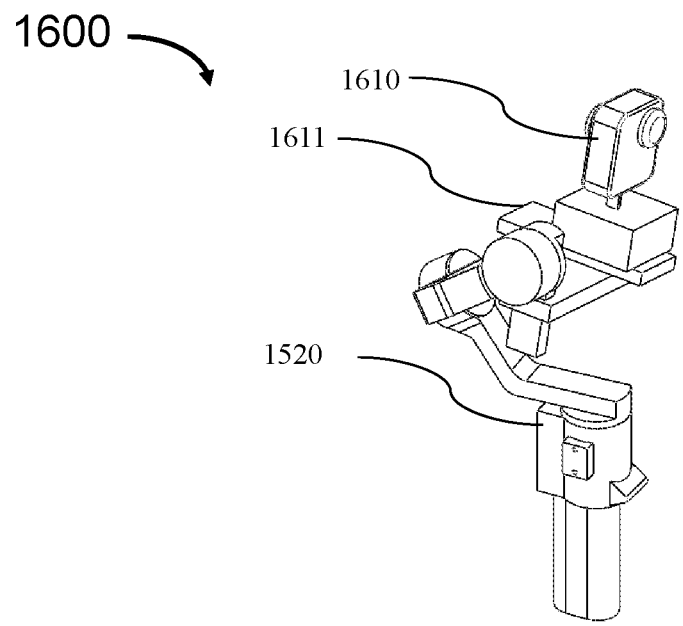
FIG. 18 is a perspective view of the example camera system, according to an example embodiment.

Now referring to FIG. 18, showing the details of camera system 1600 of the tumbler robot. The top panorama camera 1610 is seamlessly connected to the bottom panorama camera 1610, and together they form a comprehensive imaging setup. The bottom panoramic camera is closely attached to the gimbal stabilizer 1520 using a plate connector (panorama camera connector) 1611, ensuring stability positioning during operation. This integrated camera system 1600 enables the tumbler robot to capture panoramic views and maintain stable recording, enhancing its effectiveness in inspection.

Underwater Sonar

Figure 3:
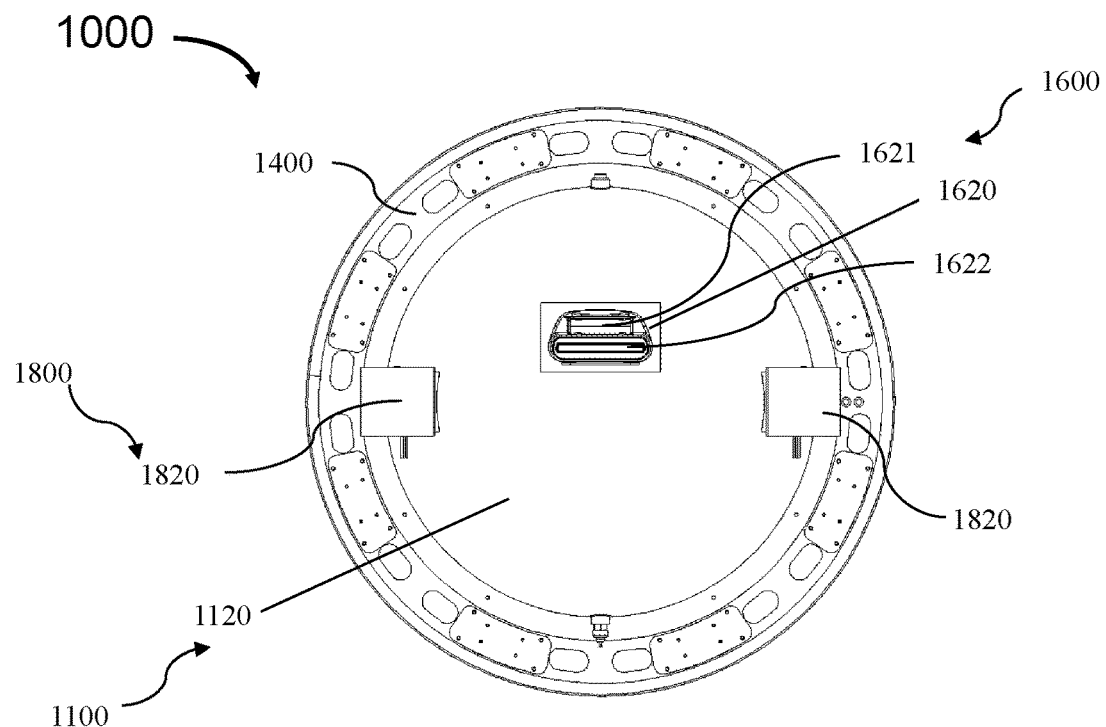
FIG. 3 is a bottom view of the tumbler robot, according to the same example embodiment of FIG. 1.

FIGS. 3-5 show the underwater sonar 1620 positioned at the bottom of the lower shell 1120. FIG. 3 shows that the underwater sonar 1620 contains an emitting array 1621 and a receiving array 1622, which work together to accurately transmit and process sonar signals, providing high-quality underwater imaging. The underwater sonar 1620 can be regarded as part of the camera system 1600 to provide additional images such as sonar images. The underwater sonar 1620 is operatively connected with the controlling system 1900. The main body of the underwater sonar 1620 and its communication port 1623 enable underwater imaging capabilities. The underwater sonar 1620 is positioned directly beneath the lower shell 1120 of the robot (as exterior component) to provide underwater image information. Directly beneath the robot, the underwater sonar 1620 captures precise and detailed image information for thorough inspections of water tunnels.

Now referring to FIG. 5, showing a front view of the tumbler robot. The underwater sonar system 1620 is positioned directly beneath the robot. The underwater sonar 1620 further includes a main body 1620 and a communication port 1623. The main body of the sonar 1620 captures sonar imaging data during inspection operations. The communication port 1623 of the sonar 1623 serves as a seamless data transmission link between the sonar system and the robot's interior industrial computer 1920. Now referring back to FIGS. 3-5. The underwater sonar 1620 is firmly fixed to the partition plate 1200 using dedicated metal underwater sonar connectors 1202 (FIG. 14) received in the empty space 1123, enhancing the overall structural stability of the sensor. A waterproof connector 1203 (FIG. 14) is also operatively connected with the underwater sonar 1620, guaranteeing reliable and watertight connectivity.

Lighting System

FIGS. 1-11 show the lighting system 1700 of the robot 1000. The lighting system 1700 contains multiple light modules 1710 within the lighting system 1700 ensure sufficient illumination to the field of view, facilitating clear visibility for the camera system 1600 to capture high-resolution video frames. In this example, the light modules are LED modules 1710 and the lighting system 1700 is operatively connected with the controlling system 1900.

Figure 2:
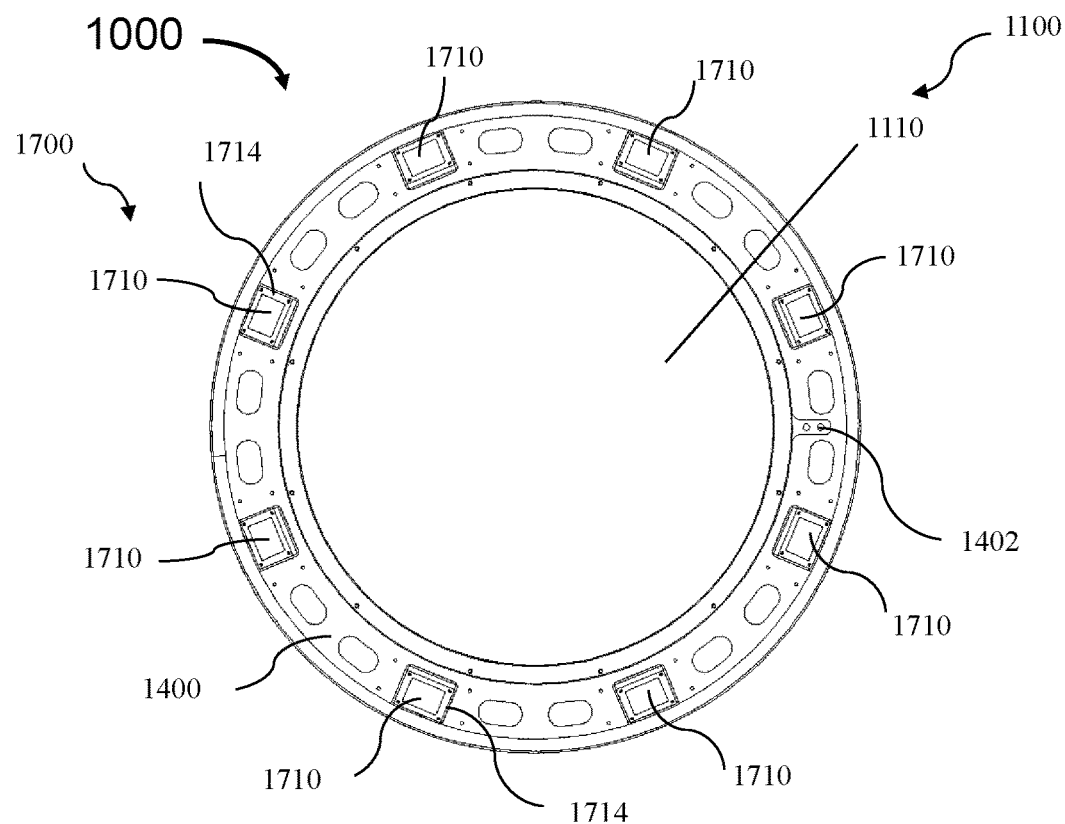
FIG. 2 is a top view of the tumbler robot, according to the same example embodiment of FIG. 1.

Now referring to FIG. 2, showing the top view of the tumbler robot. In this example, the tumbler robot includes eight LED modules 1710, with each light module is evenly disposed on the upper surface of the base plate 1400 to provide uniform illumination to the surroundings. To prevent overheating and optimize performance, each LED module 1710 is equipped with a heat sink 1714 that are fixed on the bottom side of the base plate 1400 to efficiently dissipate generated heat by the LED module 1710. This configuration allows the tumbler robot to offer consistent and well-balanced illumination, significantly enhancing visibility during its operational tasks.

Now referring to FIG. 4, showing the left view of the tumbler robot. A heat-dissipation plate 1301 is provided beneath each LED module 1710 to enhance heat dissipation, ensuring the LED modules 1710 perform optimally and have an extended lifespan. In this example, the heat-dissipation plate 1301 (FIG. 15) is fixed on the bottom surface of the base plate 1400, juxtaposing the corresponding LED module 1710 disposed on the opposing, upper surface of the base plate 1400.

Now referring to FIG. 15, showing a perspective view of the lower shell 1120 of the tumbler robot without base plate 1400. The opposing ends of each heat-dissipation plate 1301 are connected to the base plate 1400 through two fiberglass plates 1300. The heat-dissipation plate 1301 acts as a robust mounting base for each LED module 1710, ensuring effective heat dissipation for optimal performance. The heat-dissipation plate 1301 is firmly attached to the base plate 1400 using two fiberglass plates 1300, creating a sturdy structure that enables efficient heat transfer and dissipation.

Figure 16:
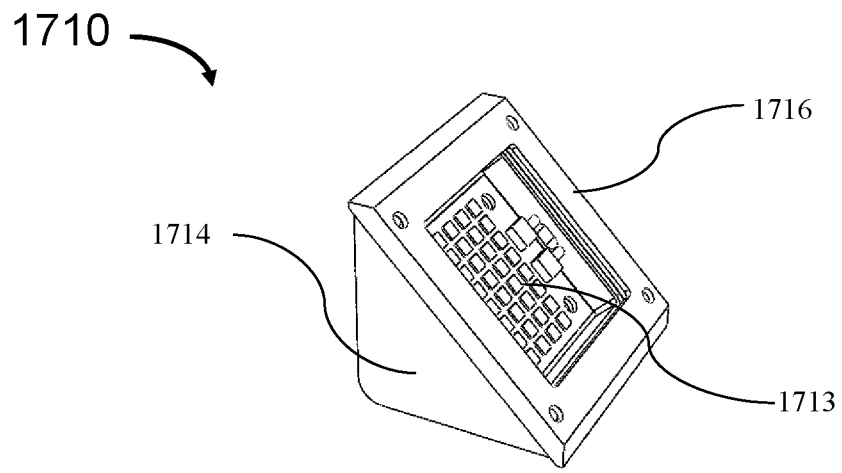
FIG. 16 is a perspective view of the example LED module, according to an example embodiment.
Figure 17:
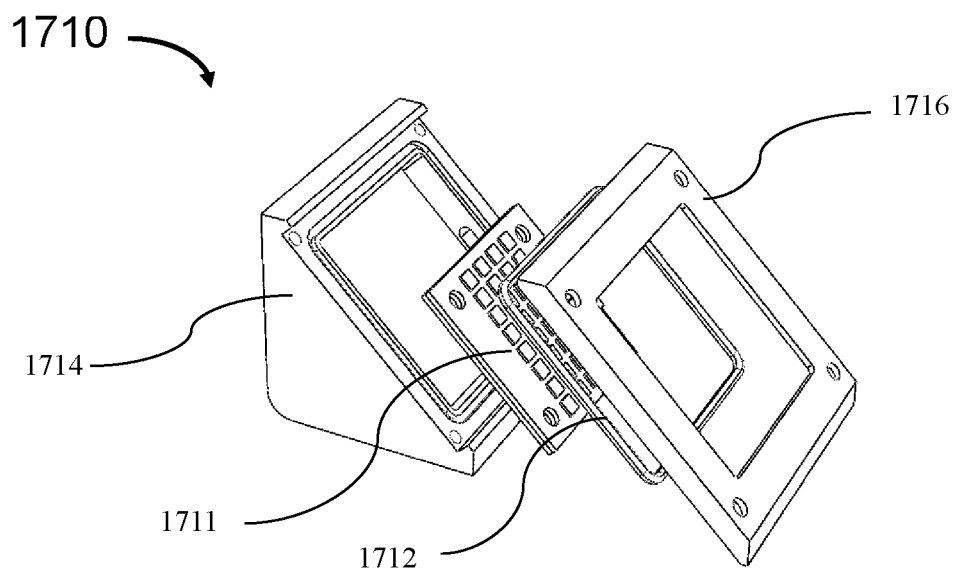
FIG. 17 is an explosion view of the LED module of FIG. 16.

Now referring to FIGS. 16-17, showing an example LED module 1710 of the tumbler robot 1000. Each LED module 1710 contains a high-power LED array 1713, a heat sink 1714, and a waterproof LED shell 1716 having a glass cover 1712. The heat sink 1714 helps dissipate the heat generated by the LED array 1713, while the waterproof LED shell 1716 together with the glass cover 1712 provides protection to the LED module 1710 against water ingress, ensuring reliable operation in challenging environments. The high-power LED array 1713 delivers powerful and efficient illumination for various applications. To ensure optimal performance and longevity, a heat sink 1714 is incorporated to additionally dissipate the heat generated during operation. FIG. 17 shows the explosion view of LED module 1710. The LED circuit board 1711 is securely adhered to the glass cover 1712, forming LED light. The components on the LED circuit board 1711 are directly attached to the heat sink 1714, while the LED light is protected by a waterproof LED shell 1716.

Propulsion System

FIGS. 1, 3, 4-6, 8-10 and 19 show a propulsion system 1800. FIG. 1 shows the propulsion system 1800 containing two underwater motors 1810, each having a protective frame 1820 work in tandem to propel and stabilize the robot's movement. Mechanical motor fasteners are provided 1402 (FIG. 10) to secure the components together. These modular elements synergistically overcome the limitations of traditional inspection methods, ensuring safe and efficient inspections in the water tunnels. Now referring to FIGS. 3 and 5, showing the bottom view and the front view of the tumbler robot, respectively. Two underwater motors 1810 are symmetrically distributed underneath the lower shell 1120 of the tumbler robot and secured by the protective frames 1820, ensuring stability and reliable performance in challenging underwater environments.

The two underwater motors 1810 are symmetrically placed on the lower shell 1120, with their orientation extending away from the lower shell 1120.

Figure 19:
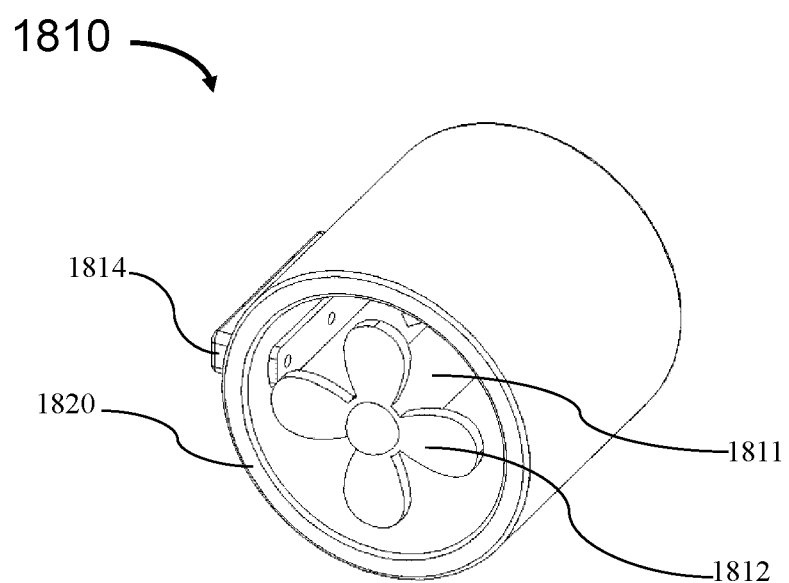
FIG. 19 is a perspective view of the underwater motor with the protective frame, according to an example embodiment.

Now referring to FIG. 19, showing a detailed view of an example underwater motor 1810 with the protective frame 1820 of the tumbler robot. The main body of the underwater motor 1810 is protected by a metal protective frame 1820, which is connected to the lower shell 1120 through a motor connector 1814 to ensure structural stability. The main body of the underwater motor 1810, comprising the rotor 1811 and blades 1812, is received by a robust metal protective frame 1820. This protective frame 1820 ensures the structural stability and integrity of the underwater motor 1810, safeguarding it from potential impacts and external forces. The protective frame 1820 is securely connected to the lower shell 1120 through a dedicated connector 1814, forming a reliable and rigid structure during operations.

Controlling System

Figure 6:
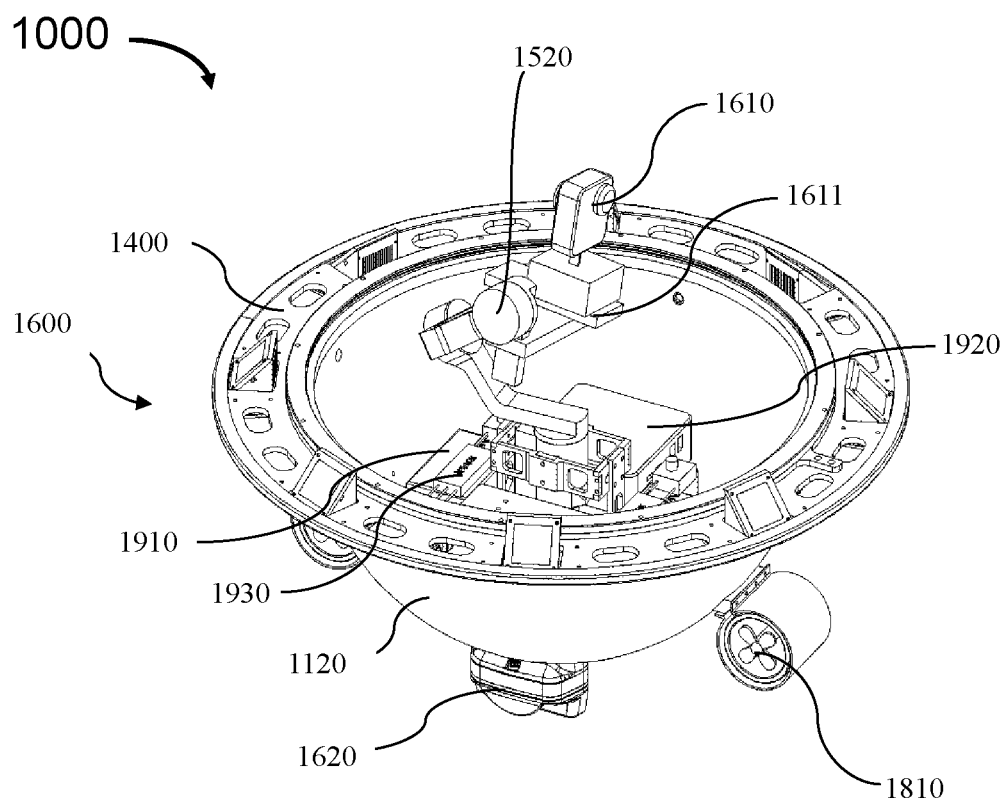
FIG. 6 is a perspective view of the interior of the tumbler robot, according to the same example embodiment of FIG. 1.
Figure 7:
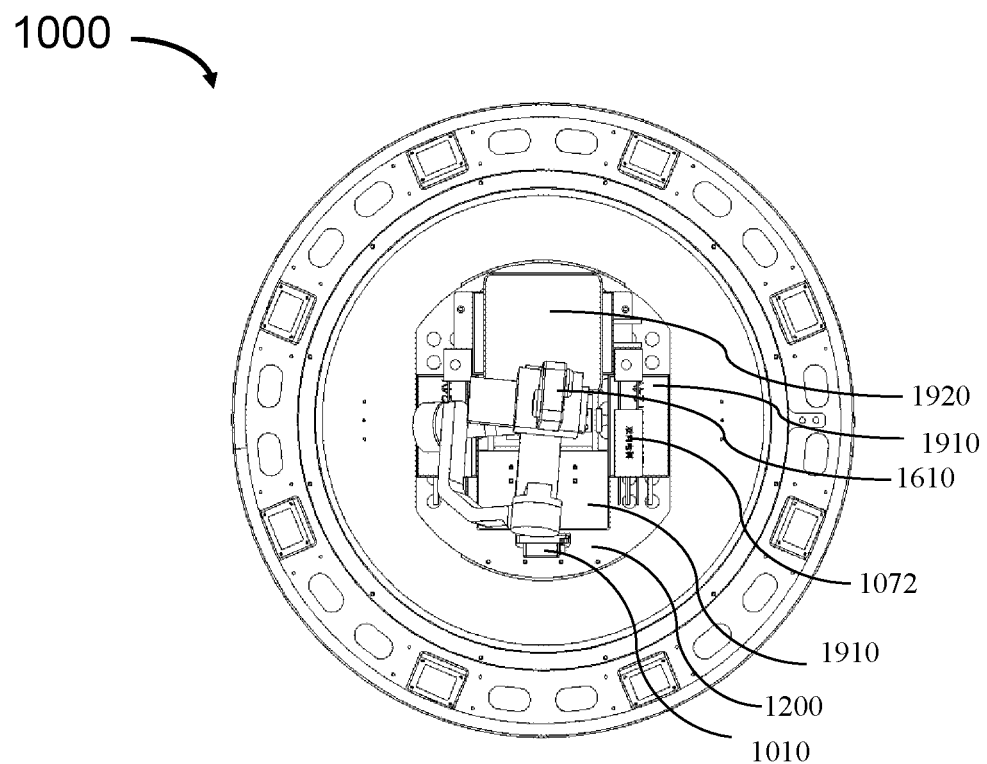
FIG. 7 is a top view of the interior of the tumbler robot, according to the same example embodiment of FIG. 1.

FIGS. 6-7 show a controlling system 1900, which is configured to provide power and control operation of the robot 1000. In this example, the controlling system 1900 contains a power supply system 1940 and processing unit, electronically and operatively connects with each other and other systems. In this example, the power supply system 1940 contains a rechargeable battery pack 1910 and a voltage regulator (not shown). The processing unit contains an industrial computer 1920. The battery pack 1910 and the industrial computer 1920 are positioned such that the overall weight is centered closer to the lower portion of the robot, and thus lower than the geometric center. The voltage regulator is configured for distributing the voltage from the battery pack 1910 to the subsystems of the tumbler robot.

In this example, the battery pack 1910 houses three rechargeable batteries, supplying the necessary power to other systems such as camera system 1600, lighting system 1700 and the propulsion system 1800, for prolonged operation. The rechargeable battery pack 1910 in the power supply system 1940 can support prolonged hours of operation of the robot without external electrical supply. The power supply unit is also equipped with a battery connector, either to recharge the battery pack 1910 or to allow the user to replace the discharged battery with a spare fully charged battery during extended use.

The industrial computer 1920 serves as the central processing unit (e.g., microprocessors, ASICS, FPGAs, GPUs, CPUs, processing cores, or the like), facilitating receiving, storing, processing and/or transmitting data (such as images, videos and/or sonar data) and system control. For example, the operating system is optionally integrated one or more wired or wireless communication interfaces, such as local area network (LAN), USB, Wi-fi, Bluetooth, Zigbee or the like etc., for data transmission, debugging and/or system update. For example, the processing unit further includes a non-transitory computer readable medium to store computer readable programs such that when it is executed by the microprocessor or industrial computer 1920, it gives signals and control the propulsion system 1800, lighting system 1700 and/or camera system 1600 of the robot to perform and operate. For example, the non-transitory computer readable medium includes any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms. For example, the processing unit further includes one or more input/output (I/O) devices, one or more programming (e.g., I/O) interfaces, and one or more communication buses for interconnecting these and various other components. In some examples, the one or more communication buses include circuitry that interconnects and controls communications between system components.

In this example, two electronic speed controller (ESCs) 1930 are electronically connected with the controlling system 1900 and the underwater motors 1810 to operate and control the underwater motors 1810, enabling precise and controlled movement of the robot in water tunnels.

In this example, an inertial measurement unit (IMU) 1010 is provided and is operatively connected with the controlling system 1900, to ensure accurate orientation and motion sensing capabilities, enhancing the robot's stability and maneuverability. For example, IMU 1010 is configured to provide accurate orientation and motion data to controlling system 1900, so as to operate the propulsion system 1800 in response to orientation and motion data. In this example, the IMU 1010 is disposed proximate to the underwater sonar, connected to the partition plate 1200 by the IMU connector 1011. The IMU 1010 is positioned near the robot's center of gravity, enabling precise motion sensing and accurate orientation determination. In some examples, IMU 1010 is regarded as part of the rotation stabilization system.

Releasing and Retrieving (RR) System

FIGS. 20-21 and 22A-C show an example configuration of the RR system. The RR system contains a main frame, lifting frame 2100, sliding rail track 2200 and a winch system 2400. The sliding rail track 2200, main frame 2300, and lifting frame 2100 are designed to provide a stable and secure platform for the robot to move vertically, and to support the winch system 2400 to release and retrieve the robot. The design of the structure provides the necessary degree of freedom for the robot to move horizontally, which is necessary for successful release and retrieval of the robot on the work platform. Now referring to FIGS. 20, 21 and 22C, the main frame 2300 contains a vertical sliding track 2310, and a winch receiving portion 2320 to install the winch system 2400. The vertical sliding track 2310 is sized and shaped to receive at least a portion of the lifting frame 2100, enabling the lifting frame 2100 to move or slide vertically within the vertical sliding track 2310, thereby providing precise adjustments to the vertical release position of the robot. The main frame 2300 is also configured to be able to slide along the rail track horizontally, enabling adjustment of the horizontal release position of the robot and be switchable between a working position and a preparing position.

Figure 20:
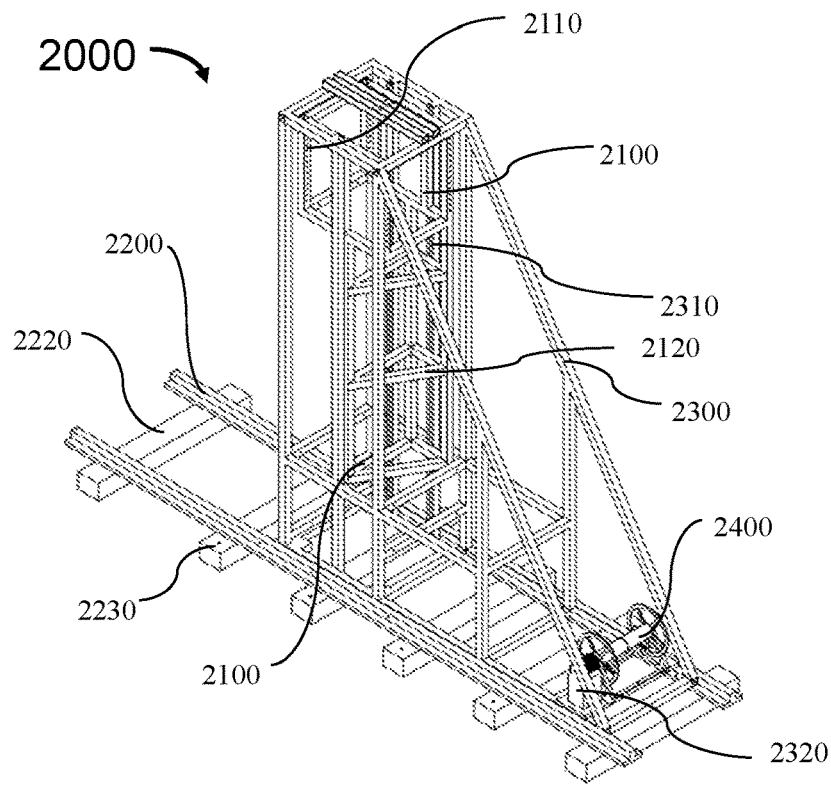
FIG. 20 is a perspective view of a RR system, according to an example embodiment.
Figure 21:
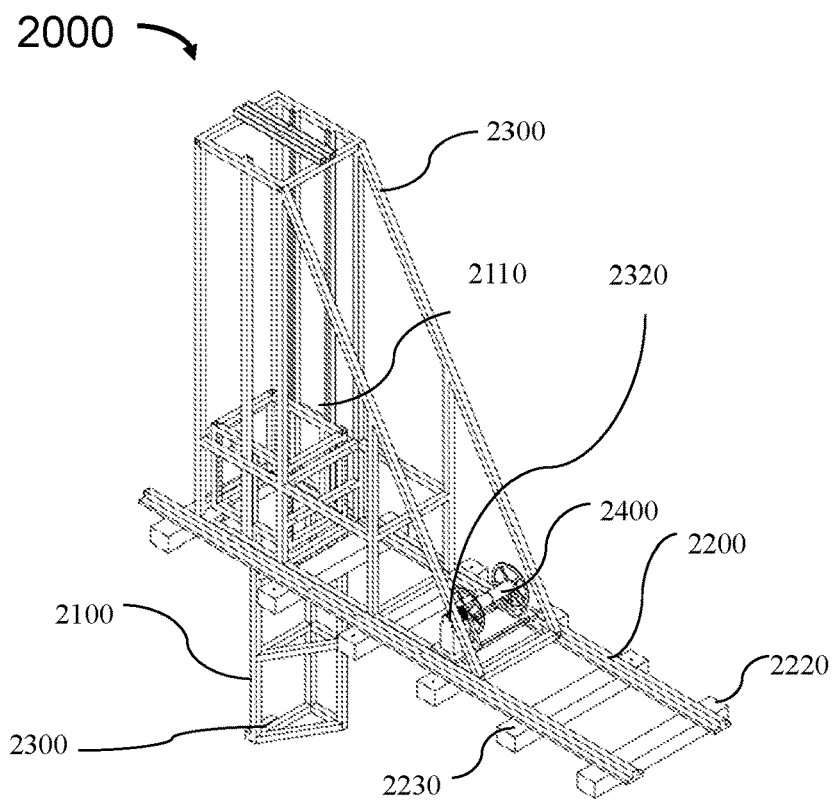
FIG. 21 is a perspective view of the RR system, according to the same example embodiment of FIG. 20.

Now referring to FIGS. 20, 21 and 22B, the lifting frame 2100 contains a rectangular head portion 2110 and a triangular cylindrical portion 2120. The lifting frame 2100 is sized and shaped such that it can be switchable between an upper position and a lower position relative to the main frame 2300, such that the robot can be lifted from or lowered towards the water tunnel, respectively. The lifting frame 2100 is configured to receive the robot and provides flexibility in adjusting the release height of the robot. In this example, the lifting frame 2100 is configured to securely fix with the robot during releasing or retrieval processes by a rope or wire through the mechanical fastener. In some examples, the rope is a floating nylon synthetic rope. The lifting frame 2100 is configured for the secure attachment and release of the tumbler robot. To guarantee structural integrity and safety, the lifting frame 2100 is constructed using a robust, triangular cylindrical structure and made of durable materials such as metals or alloys such as stainless steel, ensuring exceptional structural integrity and safety. This construction choice guarantees the lifting frame's ability to withstand the rigors of its intended use and ensures the safety of the tumbler robot during its deployment and retrieval processes.

Now referring to FIGS. 20, 21 and 22C, the winch system 2400 is disposed on the main frame 2300 away from the vertical sliding track 2310 and configured to release the robot to, and retrieve from the water tunnel by controlling winding state of the rope. The lifting frame 2100 offers flexibility in adjusting the release height of the robot, facilitating efficient deployment of the robot. The winch system 2400 enables smooth and controlled movements of releasing and retrieving the robot. The winch system 2400 is constructed using durable materials to withstand prolonged usage and resist wear and tear, ensuring long-term reliability.

Now referring to FIGS. 20, 21 and 22A, the sliding rail track 2200 is supported by multiple sleepers 2220 and secured onto a substrate such as the ground or concrete platform with anchor bolts 2230, ensuring robustness and reliability. For example, the anchor bolts 2230 are metal bolts such as expansion screws.

Now referring to FIG. 20, showing Retrieve state of the RR system. In the retrieve state, the main frame 2300 is positioned at a preparing position on the sliding rail track 2200, away from the release site (near the water tunnel), while the robot (not shown) is securely positioned at an upper position in the lifting frame 2100.

Now referring to FIG. 21, showing Release state of the RR system. In the release state, the main frame 2300 is firmly attached to the sliding rail track 2200 at the working position, while the robot (not shown) is securely positioned at the end of the lifting frame 2100, ready for deployment. The vertical movement of the robot is achieved through the lifting frame 2100, utilizing the vertical sliding track 2310 of the main frame 2300. Prior to the release or retrieval operation, the horizontal movement is adjusted to ensure precise positioning. The smooth and controlled movements of the system are supported by the winch system 2400, enabling reliable and controlled operations. The sliding rail track 2200, secured by metal bolts 2230 and sleepers 2220, maintains stability and robustness throughout the operation, ensuring the system operates safely and effectively.

In some examples, the RR system further contains a crane and a manual forklift. The crane is configured for transporting materials from the work site to the working area, while the manual forklift is configured for moving materials within the substrate such as cement platform.

General Operation of Robots and Systems

The operation of the robot and system thereof will be described. In some examples, provided is methods of using the robots and systems thereof in water tunnel inspection. In some examples, provided is methods of water tunnel inspection. Such operations and methods generally include the following steps:

1. Installing the robot onto the RR system at a retrieve state;
2. Releasing the robot into the water tunnel from the RR system at a release state, allowing the robot to operate so as to collect imaging data; and
3. Retrieving the robot from the water tunnel from the RR system at the retrieve state.

In some examples, the releasing and retrieving steps are performed with the RR system.

Releasing and Retrieving of the Inspection Robot by the RR System

The detailed steps of releasing and retrieving of the robot will be described. The general process involves the steps of: releasing the robot into the water, allowing it to complete its mission, and then retrieving it from the water, such as using the winch system 2400. In some examples, the release process includes the steps of:

1. lifting the robot to the designated release height using the lifting frame 2100;
2. lowering the robot into the water by the winch system 2400, with the floating nylon synthetic rope providing the necessary buoyancy;
3. allowing the robot to move freely to complete its mission, while maintaining tension on the rope by the winch system 2400 to ensure control and stability;
4. once the mission is complete, retrieving the robot by the winch system 2400, pulling it back to the release height using the floating nylon synthetic rope;
5. raising the robot to the main frame 2300 by the lifting frame 2100, where it can be safely secured and prepared for the next mission.

By following these steps, the RR system can release and retrieve the inspection robot safely and efficiently, ensuring the success of the site trial.

In some examples, the process of releasing the robot further involves steps of:

1. positioning it in the lifting frame 2100 at an upper position and binding the rope to the ring when the main frame 2300 is in the preparing position;
2. moving the main frame 2300 to the working position (close to the tunnel) along the sliding rail, lowering the robot under the beam and releasing the same to a desired distance;
3. moving the lifting frame 2100 to the lower position so that the rope is close to the beam, and fixing the main frame 2300 to the substrate by screws;
4. releasing the robot into the tunnel entrance at a lower position (such as about 200 meters below the beam).
5. optionally recording a video during these processes to confirm that the robot is in working condition.

By following these steps, the robot can be deployed safely and efficiently, ensuring the success of the site trial.

In some examples, the process of retrieving the robot further includes the following steps: 1. after the inspection work is completed, pulling the robot back slowly by rewinding the rope by the winch system 2400;

2. optionally lowering the lifting frame 2100 to the lower position
3. lifting the lifting frame 2100 together with the robot to the upper position
4. releasing the main frame 2300 from the sliding rail by removing the screws and moving the same to preparing position (away from the tunnel).
5. releasing the robot such as for cleaning and data collection By following these steps, the robot can be retrieved safely and efficiently, minimizing the potential for any damage to the robot or harm to personnel involved in the operation.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Devices, systems and methods discussed within different figures and paragraphs can be added to or exchanged with other devices, systems and methods in other figures or paragraphs. Further, specific numerical data values (such as specific quantities, numbers, categories, etc.) or other specific information should be interpreted as illustrative for discussing example embodiments. Such specific information is not provided to limit example embodiment.

For example, in certain embodiments, lighting system comprises eight LED modules, but different types of lighting elements, other numbers (e.g., one, two, three, four, five, six, seven, eight, nine, ten or more), sizes and shapes (oval, circular, triangular) at various locations may be used.

For example, in certain embodiments, the upper shell in the described examples are made of acrylic, but other types of durable transparent or semi transparent materials may be used. For example, in certain embodiments, the upper shell in the described examples are substantially transparent, but in other examples, only the area within the field of view of the panoramic camera is substantially transparent and the rest of the area may be semi-transparent or opaque, colored or colorless, and may be made in different materials. For example, in certain embodiments, the robot moves by underwater motors, but other forms of propulsion mechanisms may be used.

For example, in certain embodiments, main frame is configured to be movable along a transverse axis relative to the sliding rail, but may be configured to be movable along multiple directions and axes according to the practical need.

For example, in certain embodiments, lifting frame is configured to be movable along a vertical axis relative to the main frame, but may be configured to be movable along multiple directions and axes according to the practical need.

For example, in certain embodiments, the shell generally is in spherical shape, but other shapes with round edges (such as ellipsoid, egg, pear, mushroom, etc.) may also be used. For example, in certain embodiments, the tumbler robot includes three waterproof connectors, but different types of connectors, other numbers (e.g., one, two, three, four, five, six, seven, eight, nine, ten or more), sizes and shapes (oval, circular, triangular) at various locations may be used.

For example, in certain embodiments, various main structural components are made of metals or alloys such as aluminum alloy or stainless steel, but other durable materials known in the art may be used.

For example, in certain embodiments, certain systems such as the lighting system in some examples are operatively connected with the controlling system, but separate power supply and controlling unit may be used instead.

For example, in certain embodiments, the robot is released and retrieved by the RR system, but the robot can be used independently without the RR system, or can be used by other suitable systems to retrieve and release the robot.

For example, in certain embodiments, the lighting system is disposed on the base plate, but it can be disposed at other locations such as directly on the upper shell or inside the cavity.

For example, in certain embodiments, the base plate is in ring-shaped, but other shapes may be used, such as oval, egg, etc.

For example, in certain embodiments, two panoramic cameras orthogonally arranged are used, but different types of cameras, other numbers (e.g., one, two, three, four, five, six, seven, eight, nine, ten or more), sizes and shapes (oval, circular, triangular) at various locations and different arrangements may be used.

What is claimed is:

1. A robot for water tunnel inspection, comprising:
    (a) a shell, comprising an upper shell and a lower shell;
    wherein the upper shell and the lower shell are sized and shaped to match each other, together defining a closed cavity therewithin;
    (b) one or more panorama cameras that capture an image or video of a field of view of surrounding;
    (c) a plurality of light modules that provide illumination at least partially for the field of view;
    (d) one or more underwater motors that provide propulsion force to the robot in water; and
    (e) a power supply and processing unit that provide power and control operation of the robot,
    wherein the robot is configured to float on water and to have a center of gravity positioned lower than geometric center, such that during operation, at least a portion of the upper shell is maintained above the water, and at least a portion of the lower shell is maintained under water.

2. The robot of claim 1, further comprising an inertial measurement unit (IMU) operatively connected with the controlling system.

3. The robot of claim 1, wherein the upper shell is at least partially transparent.

4. The robot of claim 1, wherein density of the lower shell is higher than that of the upper shell.

5. The robot of claim 1, wherein the robot further comprises an underwater sonar that captures an underwater image.

6. The robot of claim 1, wherein the one or more panorama cameras further operatively connect with a gimbal stabilizer.

7. The robot of claim 1, wherein the power supply comprises a rechargeable battery and a voltage regulator.

8. The robot of claim 1, wherein the one or more underwater motors are attached on the lower shell.

9. The robot of claim 8, wherein the one or more underwater motors are operatively connected with an electronic speed controller.

10. The robot of claim 1, further comprising a base plate, sized and shaped to attach with the shell.

11. The robot of claim 1, wherein the plurality of light modules comprises a plurality of LED modules that are disposed on the base plate.

12. The robot of claim 11, wherein individual LED module comprises a LED array, a heat sink and a waterproof LED shell.

13. The robot of claim 1, wherein the overall shape of the shell is substantially spherical with at most a 5% deviation.

14. A tumbler robot for water tunnel inspection, comprising:
    (a) a spherical shell, comprising an upper shell and a lower shell;
    wherein the upper shell and the lower shell are sized and shaped to match each other, together defining a closed cavity therewithin;
    (b) two panorama cameras that are orthogonally arranged to provide a panoramic image or video of a field of view of the surrounding;
    (c) a gimbal stabilizer that is operatively connected with the one or more panorama cameras;
    (d) an underwater sonar that captures an underwater image;
    (e) a plurality of light modules that provide illumination at least partially for the field of view;
    (f) two underwater motors that provide propulsion force to the robot in water;
    (g) a power supply and processing unit that provide power and control operation of the robot;

(h) an inertial measurement unit (IMU), operatively connected with the controlling system;
(i) a base plate, attached to the shell,
wherein the plurality of light modules are disposed on the base plate;
wherein the two underwater motors attached on the lower shell; and
wherein the robot is configured to float on water and to have a center of gravity positioned lower than geometric center, such that during operation, at least a portion of the upper shell is maintained above the water, and at least a portion of the lower shell is maintained under water.

15. A system for water tunnel inspection, comprising:
a robot for water tunnel inspection, comprising:
(a) a shell, comprising an upper shell and a lower shell; wherein the upper shell and the lower shell are sized and shaped to match each other, together defining a closed cavity therewithin;
(b) one or more panorama cameras that capture an image or video of a field of view of surrounding;
(c) a plurality of light modules that provide illumination at least partially for the field of view;
(d) one or more underwater motors that provide propulsion force to the robot in water; and
(e) a power supply and processing unit that provide power and control operation of the robot,
wherein the robot is configured to float on water and to have a center of gravity positioned lower than geometric center, such that during operation, at least a portion of the upper shell is maintained above the water, and at least a portion of the lower shell is maintained under water; and
a releasing and retrieving system, configured to release the robot to, and retrieve from the water tunnel.

16. The system of claim 15, wherein the releasing and retrieving system comprises:
a lifting frame, configured to receive the robot;
a sliding rail track, configured to be fixable on a substrate;
a main frame that is at least partially receive the lifting frame and to be movable along the sliding rail track; and
a winch that is connectable with the robot, wherein the winch system is configured to release the robot to, and retrieve from the water tunnel.

17. The system of claim 16, wherein the lifting frame is configured to be switchable between an upper position and a lower position relative to the main frame, such that the robot is lifted from or lowered towards the water tunnel, respectively.

18. The system of claim 16, wherein the main frame is configured to be switchable between a working position and a preparing position relative to the sliding rail track, such that the robot is moved closer to or away from the water tunnel, respectively.

* * * * *